(12) United States Patent
Busch et al.

(10) Patent No.: US 10,942,944 B2
(45) Date of Patent: *Mar. 9, 2021

(54) MANAGING CONTENT ACROSS DISCRETE SYSTEMS

(71) Applicant: Dropbox, Inc., San Francisco, CA (US)

(72) Inventors: Katherine Busch, San Francisco, CA (US); Amandine Lee, San Francisco, CA (US); Erik Hope, San Francisco, CA (US); Stephen Poletto, San Francisco, CA (US); Zrinka Gavran, San Francisco, CA (US); Joshua Kaplan, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/135,316

(22) Filed: Sep. 19, 2018

(65) Prior Publication Data
US 2019/0188210 A1    Jun. 20, 2019

Related U.S. Application Data

(63) Continuation of application No. 14/978,653, filed on Dec. 22, 2015, now Pat. No. 10,108,688.

(51) Int. Cl.
*G06F 16/27* (2019.01)
*G06F 16/23* (2019.01)

(52) U.S. Cl.
CPC .............. *G06F 16/27* (2019.01); *G06F 16/23* (2019.01)

(58) Field of Classification Search
CPC .... G06F 16/23; G06F 16/27; G06F 17/30575; G06F 17/30345

(Continued)

(56) References Cited

U.S. PATENT DOCUMENTS

| | | |
|---|---|---|
| 96,029 A | 10/1869 | Oliver et al. |
| 5,634,129 A | 5/1997 | Dickinson et al. |

(Continued)

FOREIGN PATENT DOCUMENTS

| | | |
|---|---|---|
| AU | 2016201472 B2 | 12/2016 |
| AU | 2017201395 A1 | 3/2017 |

(Continued)

OTHER PUBLICATIONS

Final Office Action from U.S. Appl. No. 15/789,809, dated Sep. 22, 2020, 23 pages.

(Continued)

*Primary Examiner* — Kuen S Lu
(74) *Attorney, Agent, or Firm* — DLA Piper LLP (US)

(57) ABSTRACT

Disclosed are systems, methods, and non-transitory computer-readable storage media for managing content across discrete systems. A content management system can be implemented to manage content items and synchronize content items across devices. A content collaboration system can be implemented to generate documents and facilitate collaboration on documents. To take advantage of the content management system's functionality to manage and synchronize content items while also providing the collaboration functionality of the content collaboration system, the content management system can store and manage references to documents created in the content collaboration system. The document references can be managed by the content management system such that the document references appear to users as if the document references were the referenced document in the collaboration system.

18 Claims, 9 Drawing Sheets

(58) Field of Classification Search
USPC .......................................................... 707/621
See application file for complete search history.

(56) References Cited

U.S. PATENT DOCUMENTS

| | | | |
|---|---|---|---|
| 5,781,732 A | 7/1998 | Adams | |
| 6,370,567 B1 | 4/2002 | Ouchi et al. | |
| 6,505,236 B1 | 1/2003 | Pollack et al. | |
| 6,839,741 B1 | 1/2005 | Tsai et al. | |
| 6,970,906 B1 | 11/2005 | Parsons et al. | |
| 7,039,678 B1 | 5/2006 | Halahmi et al. | |
| 7,543,237 B2 | 6/2009 | Kontny et al. | |
| 7,584,199 B2 | 9/2009 | Matsusaka | |
| 7,689,510 B2 | 3/2010 | Lamkin et al. | |
| 7,693,958 B2 | 4/2010 | Teodosiu et al. | |
| 7,774,710 B2 | 8/2010 | Krishnan et al. | |
| 7,818,678 B2 | 10/2010 | Massand | |
| 7,865,394 B1 | 1/2011 | Calloway et al. | |
| 8,015,491 B2 | 9/2011 | Shaver et al. | |
| 8,117,271 B2 | 2/2012 | McConn et al. | |
| 8,122,015 B2 | 2/2012 | Liu et al. | |
| 8,122,051 B2 | 2/2012 | Spring et al. | |
| 8,161,120 B2 | 4/2012 | Tan et al. | |
| 8,196,029 B1 | 6/2012 | Rucker et al. | |
| 8,214,747 B1 | 7/2012 | Yankovich et al. | |
| 8,245,141 B1 | 8/2012 | Fuller et al. | |
| 8,250,150 B2 | 8/2012 | Beck et al. | |
| 8,316,128 B2 | 11/2012 | Beck et al. | |
| 8,341,532 B2 | 12/2012 | Ryan et al. | |
| 8,438,185 B2 | 5/2013 | Teranishi et al. | |
| 8,533,268 B1 | 9/2013 | Vernon et al. | |
| 8,543,926 B2 | 9/2013 | Giles et al. | |
| 8,700,719 B1 | 4/2014 | Covitz et al. | |
| 8,713,106 B2 | 4/2014 | Spataro et al. | |
| 8,793,324 B1 | 7/2014 | Schabes et al. | |
| 8,881,129 B1 | 11/2014 | McKinnon et al. | |
| 8,892,679 B1 | 11/2014 | Destagnol et al. | |
| 8,930,412 B2 | 1/2015 | Nelson et al. | |
| 8,977,722 B2 | 3/2015 | Tsao | |
| 8,984,536 B1 | 3/2015 | Hushon, Jr. et al. | |
| 8,990,151 B2 | 3/2015 | Savage et al. | |
| 9,002,962 B2 | 4/2015 | Lynch et al. | |
| 9,166,954 B2 | 10/2015 | Swineford et al. | |
| 9,235,268 B2 | 1/2016 | Arrasvuori et al. | |
| 9,240,962 B2 | 1/2016 | Jung et al. | |
| 9,251,360 B2 | 2/2016 | Meyer et al. | |
| 9,298,355 B1 | 3/2016 | Beausoleil et al. | |
| 9,300,609 B1 | 3/2016 | Beausoleil et al. | |
| 9,395,892 B1 | 7/2016 | Beausoleil et al. | |
| 9,395,893 B1 | 7/2016 | Beausoleil et al. | |
| 9,436,635 B1 | 9/2016 | Hushon, Jr. et al. | |
| 9,542,391 B1 | 1/2017 | Eisner et al. | |
| 9,559,996 B1 | 1/2017 | Clark et al. | |
| 9,641,488 B2 | 5/2017 | Mityagin et al. | |
| 9,646,010 B2 | 5/2017 | Mokhtarzada et al. | |
| 9,667,676 B1 | 5/2017 | Lo et al. | |
| 9,727,470 B1 | 8/2017 | Cande et al. | |
| 9,767,101 B2 | 9/2017 | Abramson et al. | |
| 9,785,658 B2 | 10/2017 | Suarez et al. | |
| 9,836,549 B2 | 12/2017 | Heinrich et al. | |
| 9,846,528 B2 | 12/2017 | Eccleston et al. | |
| 9,946,691 B2 | 4/2018 | Grigorovitch et al. | |
| 9,959,280 B1 | 5/2018 | Whitehead et al. | |
| 9,978,040 B2 | 5/2018 | Lee et al. | |
| 10,007,804 B2 | 6/2018 | Redberg | |
| 10,013,574 B2 | 7/2018 | Hore | |
| 10,057,140 B2 | 8/2018 | Fulton et al. | |
| 10,157,084 B2 | 12/2018 | Nachtrab et al. | |
| 10,291,395 B1 | 5/2019 | Nenov et al. | |
| 10,296,594 B2 | 5/2019 | Datta | |
| 10,476,758 B2 | 11/2019 | Marvin et al. | |
| 10,657,228 B1 | 5/2020 | Kaplan et al. | |
| 10,664,319 B1 | 5/2020 | Kaplan et al. | |
| 10,754,827 B2 | 8/2020 | Kaplan et al. | |
| 10,762,472 B1 | 9/2020 | Miller et al. | |
| 2002/0120485 A1 | 8/2002 | Kirkconnell-Ewing et al. | |
| 2002/0138582 A1 | 9/2002 | Chandra et al. | |
| 2003/0046134 A1 | 3/2003 | Frolick et al. | |
| 2003/0131062 A1 | 7/2003 | Miyashita et al. | |
| 2003/0135565 A1 | 7/2003 | Estrada et al. | |
| 2004/0117445 A9 | 6/2004 | Lee et al. | |
| 2004/0162878 A1 | 8/2004 | Lewis et al. | |
| 2004/0187140 A1 | 9/2004 | Aigner et al. | |
| 2004/0225647 A1 | 11/2004 | Connelly et al. | |
| 2005/0022931 A1 | 2/2005 | Min et al. | |
| 2005/0028008 A1 | 2/2005 | Kumar et al. | |
| 2005/0091289 A1 | 4/2005 | Shappell et al. | |
| 2005/0097440 A1 | 5/2005 | Lusk et al. | |
| 2005/0097441 A1 | 5/2005 | Herbach et al. | |
| 2005/0108293 A1 | 5/2005 | Lipman et al. | |
| 2005/0198125 A1 | 9/2005 | MacLeod Beck et al. | |
| 2005/0198299 A1 | 9/2005 | Beck et al. | |
| 2005/0222931 A1 | 10/2005 | Mamou et al. | |
| 2005/0223315 A1 | 10/2005 | Shimizu et al. | |
| 2005/0289512 A1 | 12/2005 | Matsusaka | |
| 2006/0020904 A1 | 1/2006 | Aaltonen et al. | |
| 2006/0080432 A1 | 4/2006 | Spataro et al. | |
| 2006/0101443 A1 | 5/2006 | Nasr | |
| 2006/0136821 A1 | 6/2006 | Barabe et al. | |
| 2007/0033088 A1 | 2/2007 | Aigner et al. | |
| 2007/0050324 A1 | 3/2007 | Trinkel et al. | |
| 2007/0067726 A1 | 3/2007 | Flynt et al. | |
| 2007/0100829 A1 | 5/2007 | Allen et al. | |
| 2007/0150551 A1 | 6/2007 | Krishnan et al. | |
| 2007/0276795 A1 | 11/2007 | Poulsen et al. | |
| 2007/0277098 A1 | 11/2007 | Shahar et al. | |
| 2007/0288839 A1 | 12/2007 | Kurosawa et al. | |
| 2008/0028323 A1 | 1/2008 | Rosen et al. | |
| 2008/0040388 A1* | 2/2008 | Petri | G06F 16/1734 |
| 2008/0059539 A1 | 3/2008 | Chin et al. | |
| 2008/0077614 A1 | 3/2008 | Roy et al. | |
| 2008/0091761 A1 | 4/2008 | Tsao | |
| 2008/0120382 A1 | 5/2008 | Heidloff et al. | |
| 2008/0140732 A1 | 6/2008 | Wilson et al. | |
| 2008/0195659 A1 | 8/2008 | Rawle | |
| 2008/0201422 A1 | 8/2008 | Peccora et al. | |
| 2008/0256458 A1 | 10/2008 | Aldred et al. | |
| 2008/0288453 A1 | 11/2008 | Smetters et al. | |
| 2009/0013043 A1 | 1/2009 | Tan | |
| 2009/0064284 A1 | 3/2009 | Poston et al. | |
| 2009/0131116 A1 | 5/2009 | Tsuchiya et al. | |
| 2009/0138808 A1 | 5/2009 | Moromisato et al. | |
| 2009/0177754 A1 | 7/2009 | Brezina et al. | |
| 2009/0182778 A1 | 7/2009 | Tormasov | |
| 2009/0235182 A1 | 9/2009 | Kagawa et al. | |
| 2009/0249244 A1 | 10/2009 | Robinson et al. | |
| 2009/0282421 A1 | 11/2009 | Jaffer et al. | |
| 2009/0307605 A1 | 12/2009 | Ryan et al. | |
| 2010/0024011 A1 | 1/2010 | Fukuoka | |
| 2010/0082713 A1 | 4/2010 | Frid-Nielsen et al. | |
| 2010/0095198 A1 | 4/2010 | Bultrowicz et al. | |
| 2010/0138503 A1 | 6/2010 | Ishikawa et al. | |
| 2010/0151431 A1 | 6/2010 | Miller et al. | |
| 2010/0180196 A1 | 7/2010 | Matsusaka | |
| 2010/0211621 A1 | 8/2010 | Hariharan et al. | |
| 2010/0241711 A1 | 9/2010 | Ansari et al. | |
| 2010/0262435 A1 | 10/2010 | Smith et al. | |
| 2010/0299763 A1 | 11/2010 | Marcus et al. | |
| 2010/0325199 A1 | 12/2010 | Park et al. | |
| 2011/0014524 A1 | 1/2011 | Skotheim et al. | |
| 2011/0022662 A1 | 1/2011 | Barber-Mingo et al. | |
| 2011/0119353 A1 | 5/2011 | Tsao | |
| 2011/0145245 A1 | 6/2011 | Choi et al. | |
| 2011/0161795 A1 | 6/2011 | Bellwood et al. | |
| 2011/0202430 A1 | 8/2011 | Narayanan et al. | |
| 2011/0214088 A1 | 9/2011 | Sandru et al. | |
| 2011/0247031 A1 | 10/2011 | Jacoby | |
| 2011/0249024 A1 | 10/2011 | Arrasvuori et al. | |
| 2011/0258554 A1 | 10/2011 | Sidenur et al. | |
| 2012/0011102 A1* | 1/2012 | Borden | G06F 16/137 707/654 |
| 2012/0079389 A1 | 3/2012 | Tsao | |
| 2012/0089610 A1 | 4/2012 | Agrawal et al. | |
| 2012/0124092 A1 | 5/2012 | Teranishi et al. | |

(56) References Cited

U.S. PATENT DOCUMENTS

| | | |
|---|---|---|
| 2012/0143917 A1 | 6/2012 | Prabaker et al. |
| 2012/0151379 A1 | 6/2012 | Schultz et al. |
| 2012/0166516 A1 | 6/2012 | Simmons et al. |
| 2012/0182384 A1 | 7/2012 | Anderson et al. |
| 2012/0192086 A1 | 7/2012 | Ghods et al. |
| 2012/0221520 A1 | 8/2012 | Garrett et al. |
| 2012/0284290 A1 | 11/2012 | Keebler et al. |
| 2012/0290531 A1 | 11/2012 | Kallakuri et al. |
| 2012/0290926 A1 | 11/2012 | Kapadia et al. |
| 2012/0297183 A1 | 11/2012 | Mukkara et al. |
| 2012/0311060 A1 | 12/2012 | Beck et al. |
| 2012/0317239 A1 | 12/2012 | Mulder et al. |
| 2012/0331108 A1 | 12/2012 | Ferdowsi et al. |
| 2013/0013560 A1 | 1/2013 | Goldberg et al. |
| 2013/0014023 A1 | 1/2013 | Lee et al. |
| 2013/0024788 A1 | 1/2013 | Olsen et al. |
| 2013/0073971 A1 | 3/2013 | Huang et al. |
| 2013/0080919 A1 | 3/2013 | Kiang et al. |
| 2013/0117376 A1 | 5/2013 | Filman et al. |
| 2013/0124638 A1 | 5/2013 | Barreto et al. |
| 2013/0138608 A1 | 5/2013 | Smith |
| 2013/0138723 A1 | 5/2013 | Ku et al. |
| 2013/0173798 A1 | 7/2013 | Micucci et al. |
| 2013/0179799 A1 | 7/2013 | Savage |
| 2013/0191339 A1 | 7/2013 | Haden et al. |
| 2013/0198600 A1 | 8/2013 | Lockhart et al. |
| 2013/0212112 A1 | 8/2013 | Blom et al. |
| 2013/0218829 A1* | 8/2013 | Martinez ............ G06F 21/6272 707/608 |
| 2013/0227015 A1 | 8/2013 | Mihara et al. |
| 2013/0246901 A1 | 9/2013 | Massand |
| 2013/0254699 A1 | 9/2013 | Bashir et al. |
| 2013/0275509 A1 | 10/2013 | Micucci et al. |
| 2013/0297317 A1 | 11/2013 | Lee et al. |
| 2013/0305165 A1 | 11/2013 | Zuber et al. |
| 2013/0311557 A1 | 11/2013 | Motes et al. |
| 2014/0012836 A1 | 1/2014 | Bercovici et al. |
| 2014/0013246 A1 | 1/2014 | Beechuk et al. |
| 2014/0029751 A1 | 1/2014 | Swineford et al. |
| 2014/0047560 A1 | 2/2014 | Meyer et al. |
| 2014/0068401 A1 | 3/2014 | Kirigin |
| 2014/0082073 A1 | 3/2014 | Wable et al. |
| 2014/0082101 A1 | 3/2014 | Wable et al. |
| 2014/0089406 A1 | 3/2014 | Gniffke et al. |
| 2014/0122569 A1 | 5/2014 | Abel et al. |
| 2014/0133632 A1 | 5/2014 | Wakai et al. |
| 2014/0136989 A1 | 5/2014 | Choi et al. |
| 2014/0156416 A1 | 6/2014 | Goenka et al. |
| 2014/0164535 A1 | 6/2014 | Lynch et al. |
| 2014/0172925 A1 | 6/2014 | Goldbrenner et al. |
| 2014/0208220 A1 | 7/2014 | Watal |
| 2014/0210756 A1 | 7/2014 | Lee et al. |
| 2014/0215551 A1 | 7/2014 | Allain et al. |
| 2014/0222917 A1 | 8/2014 | Poirier |
| 2014/0237464 A1 | 8/2014 | Waterman et al. |
| 2014/0280484 A1 | 9/2014 | Klemenz et al. |
| 2014/0289351 A1 | 9/2014 | Chen et al. |
| 2014/0289645 A1 | 9/2014 | Megiddo et al. |
| 2014/0289658 A1 | 9/2014 | Gelernter et al. |
| 2014/0294167 A1 | 10/2014 | Kim et al. |
| 2014/0297759 A1 | 10/2014 | Mody |
| 2014/0298207 A1 | 10/2014 | Ittah et al. |
| 2014/0304618 A1 | 10/2014 | Carriero et al. |
| 2014/0304836 A1 | 10/2014 | Velamoor et al. |
| 2014/0344739 A1 | 11/2014 | Yoon et al. |
| 2014/0359465 A1 | 12/2014 | Litan Sever et al. |
| 2014/0365263 A1 | 12/2014 | Honeyman et al. |
| 2014/0372539 A1 | 12/2014 | Zaveri |
| 2014/0372906 A1 | 12/2014 | Campbell et al. |
| 2014/0372923 A1 | 12/2014 | Rossi et al. |
| 2015/0019480 A1 | 1/2015 | Maquaire et al. |
| 2015/0026260 A1 | 1/2015 | Worthley et al. |
| 2015/0026604 A1 | 1/2015 | Mulukuri et al. |
| 2015/0032829 A1 | 1/2015 | Barshow et al. |
| 2015/0039360 A1 | 2/2015 | Gowdra et al. |
| 2015/0074044 A1 | 3/2015 | Metreveli et al. |
| 2015/0095799 A1 | 4/2015 | Tsao |
| 2015/0100889 A1 | 4/2015 | Tuchman et al. |
| 2015/0134751 A1 | 5/2015 | Meyers, Jr. et al. |
| 2015/0135097 A1 | 5/2015 | Carriero et al. |
| 2015/0135300 A1 | 5/2015 | Ford et al. |
| 2015/0142742 A1* | 5/2015 | Hong ................... G06F 16/178 707/634 |
| 2015/0149929 A1 | 5/2015 | Shepherd et al. |
| 2015/0156274 A1 | 6/2015 | Alten et al. |
| 2015/0160989 A1 | 6/2015 | Maes et al. |
| 2015/0169566 A1 | 6/2015 | Yang et al. |
| 2015/0188960 A1 | 7/2015 | Alhaidar et al. |
| 2015/0200885 A1 | 7/2015 | Sharp et al. |
| 2015/0213037 A1 | 7/2015 | Baldwin et al. |
| 2015/0286371 A1 | 10/2015 | Degani et al. |
| 2015/0288775 A1 | 10/2015 | Larabie-Belanger |
| 2015/0302421 A1 | 10/2015 | Caton et al. |
| 2015/0304265 A1 | 10/2015 | Vincent et al. |
| 2015/0370796 A1 | 12/2015 | Abramson et al. |
| 2015/0378974 A1* | 12/2015 | Massand ................ G06F 16/00 715/229 |
| 2016/0034844 A1 | 2/2016 | Kofman |
| 2016/0072889 A1 | 3/2016 | Jung et al. |
| 2016/0085421 A1 | 3/2016 | Feeney |
| 2016/0094495 A1 | 3/2016 | Ahuja et al. |
| 2016/0127452 A1 | 5/2016 | Newman et al. |
| 2016/0132529 A1 | 5/2016 | Acharya |
| 2016/0140139 A1 | 5/2016 | Torres et al. |
| 2016/0182515 A1 | 6/2016 | Barraclough et al. |
| 2016/0241509 A1 | 8/2016 | Akcin |
| 2016/0247245 A1 | 8/2016 | Baic et al. |
| 2016/0259508 A1 | 9/2016 | Eccleston et al. |
| 2016/0277537 A1 | 9/2016 | Liang et al. |
| 2016/0283085 A1 | 9/2016 | Beausoleil et al. |
| 2016/0283502 A1 | 9/2016 | Beausoleil et al. |
| 2016/0283567 A1 | 9/2016 | Beausoleil et al. |
| 2016/0285702 A1 | 9/2016 | Beausoleil et al. |
| 2016/0285795 A1 | 9/2016 | Beausoleil et al. |
| 2016/0285796 A1 | 9/2016 | Beausoleil et al. |
| 2016/0285797 A1 | 9/2016 | Beausoleil et al. |
| 2016/0285817 A1 | 9/2016 | Beausoleil et al. |
| 2016/0285818 A1 | 9/2016 | Beausoleil et al. |
| 2016/0285890 A1 | 9/2016 | Beausoleil et al. |
| 2017/0006102 A1 | 1/2017 | Mody et al. |
| 2017/0024392 A1 | 1/2017 | Shah et al. |
| 2017/0024410 A1* | 1/2017 | Pola ..................... G06F 16/178 |
| 2017/0046531 A1 | 2/2017 | Roberts |
| 2017/0078302 A1 | 3/2017 | Mellor et al. |
| 2017/0192656 A1 | 7/2017 | Pedrick et al. |
| 2017/0214726 A1 | 7/2017 | Malatesha et al. |
| 2017/0220605 A1 | 8/2017 | Nivala et al. |
| 2017/0220657 A1 | 8/2017 | Nivala et al. |
| 2017/0250969 A1 | 8/2017 | O'Brien et al. |
| 2017/0272335 A1 | 9/2017 | Hamlin et al. |
| 2017/0279859 A1 | 9/2017 | Pogorelik |
| 2017/0285928 A1 | 10/2017 | Beausoleil et al. |
| 2018/0027006 A1 | 1/2018 | Zimmermann et al. |
| 2018/0063143 A1 | 3/2018 | Wilson et al. |
| 2018/0063258 A1 | 3/2018 | Wang et al. |
| 2018/0067811 A1 | 3/2018 | Mowatt |
| 2018/0074786 A1 | 3/2018 | Oberbreckling et al. |
| 2018/0113870 A1 | 4/2018 | Rogers |
| 2018/0300756 A1 | 10/2018 | Saxena et al. |
| 2018/0322510 A1 | 11/2018 | Cleaver et al. |
| 2019/0121518 A1 | 4/2019 | Anima et al. |
| 2019/0272281 A1 | 9/2019 | Hawa et al. |
| 2019/0318015 A1 | 10/2019 | Cheesman |
| 2020/0026532 A1 | 1/2020 | Bill et al. |
| 2020/0076862 A1 | 3/2020 | Eliason et al. |
| 2020/0142549 A1 | 5/2020 | Kaplan et al. |
| 2020/0142750 A1 | 5/2020 | Kaplan et al. |
| 2020/0142751 A1 | 5/2020 | Kaplan et al. |
| 2020/0142863 A1 | 5/2020 | Kaplan et al. |
| 2020/0142936 A1 | 5/2020 | Kaplan et al. |
| 2020/0143011 A1 | 5/2020 | Kaplan et al. |
| 2020/0145499 A1 | 5/2020 | Kaplan et al. |

(56) References Cited

U.S. PATENT DOCUMENTS

| | | | |
|---|---|---|---|
| 2020/0265014 | A1 | 8/2020 | Kaplan et al. |
| 2020/0265015 | A1 | 8/2020 | Kaplan et al. |
| 2020/0279028 | A1 | 9/2020 | Kaplan et al. |

FOREIGN PATENT DOCUMENTS

| | | | |
|---|---|---|---|
| AU | 2016201019 | B2 | 4/2017 |
| AU | 2017204625 | A1 | 7/2017 |
| AU | 2016235983 | B2 | 10/2017 |
| AU | 2016236015 | B2 | 10/2017 |
| AU | 2016235985 | B2 | 6/2018 |
| AU | 2016235984 | B2 | 10/2018 |
| CN | 105100170 | A | 11/2015 |
| CN | 107431631 | A | 12/2017 |
| CN | 107438840 | A | 12/2017 |
| EP | 3073674 | A1 | 9/2016 |
| EP | 3251289 | A1 | 12/2017 |
| EP | 3251290 | A1 | 12/2017 |
| EP | 3251305 | A1 | 12/2017 |
| EP | 3251288 | B1 | 9/2019 |
| EP | 3073673 | | 7/2020 |
| JP | S61279916 | A | 12/1986 |
| JP | 2000060803 | A | 2/2000 |
| JP | 2001202405 | A | 7/2001 |
| JP | 2002244988 | A | 8/2002 |
| JP | 2002297883 | A | 10/2002 |
| JP | 2003256323 | A | 9/2003 |
| JP | 2004013267 | A | 1/2004 |
| JP | 2004046796 | A | 2/2004 |
| JP | 2004362118 | A | 12/2004 |
| JP | 2006092074 | A | 4/2006 |
| JP | 2006189958 | A | 7/2006 |
| JP | 2007072523 | A | 3/2007 |
| JP | 2009069899 | A | 4/2009 |
| JP | 2013161481 | A | 8/2013 |
| JP | 2013175059 | A | 9/2013 |
| JP | 2014134961 | A | 7/2014 |
| JP | 2015032092 | A | 2/2015 |
| JP | 2016181250 | A | 10/2016 |
| JP | 2016184404 | A | 10/2016 |
| JP | 6028118 | B2 | 11/2016 |
| JP | 2017084356 | A | 5/2017 |
| JP | 2017182790 | A | 10/2017 |
| WO | 2010102296 | A1 | 9/2010 |
| WO | 2013033144 | A2 | 3/2013 |
| WO | 2016085822 | A1 | 6/2016 |
| WO | 2016106088 | A1 | 6/2016 |
| WO | 2016153676 | A1 | 9/2016 |
| WO | 2016153735 | A1 | 9/2016 |
| WO | 2016153736 | A1 | 9/2016 |
| WO | 2016153737 | A1 | 9/2016 |
| WO | 2016168748 | A1 | 10/2016 |

OTHER PUBLICATIONS

Notice of Allowance from U.S. Appl. No. 16/877,196, dated Sep. 23, 2020, 13 pages.
Notification of Reason(s) for Refusal for Japanese Application No. 2019-508895 dated Aug. 21, 2020, 7 pages.
Notice of Allowance from U.S. Appl. No. 16/877,196, dated Nov. 3, 2020, 10 pages.
Beliz System, "Making Documents on Google Drive," Digital Documents Laboratories, Jul. 18, 2014, Retrieved from:<https://watasu.com/dedoken/cloud/page2.html, 9 pages.
Communication Pursuant to Article 94(3) EPC for European Application No. 17805064.7 dated Nov. 5, 2019, 4 pages.
Crucial Works Inc, "Sharing Folders," Apps x Support, Jan. 29, 2013, Retrieved from: <https://web.archive,org/web/20130129101828/ttp://www.appsupport.jp/drive/share-folderon Aug. 29, 2017, 8 pages.
Examination Report No. 1, for Australian Application No. 2017385026, dated Nov. 28, 2019, 6 pages.
Examination Report No. 2, for Australian Application No. 2017385026, dated Apr. 30, 2020, 5 pages.

Freedman V., et al., "A Collaborative Extensible User Environment for Simulation and Knowledge Management," IEEE, 2015, pp. 280-286.
Google Inc., "View and Create Documents on Android," Mar. 19, 2015, Wayback Machine, Google Docs, downloaded from <https://web.archive.org/web/20150319022434/ttps://support.google.com/does/answer/3420399?hl=en,>May 30, 2016, 3 pages.
Hoomey, Estyle Inc., "Google Drive How to Use Leverage Surgery "spreadsheet" that can be used in Excel instead!," Nov. 9, 2013, retrieved from<https://web.archive.org/web/20131109104805/ttp:/1hoomey.net/googledrive-study-4> on Jun. 30, 2016, 18 pages.
International Appl. No. PCT/US2019/057636, International Search Report and Written Opinion dated Apr. 1, 2020, 18 pages.
International Search Report and Written Opinion for PCT Application No. PCT/US16/19052, dated Nov. 7, 2016, 9 pages.
International Search Report and Written Opinion for PCT Application No. PCT/US16/20117, dated May 13, 2016, 10 pages.
International Search Report and Written Opinion for PCT Application No. PCT/US16/20124, dated May 24, 2016, 10 pages.
International Search Report and Written Opinion for PCT Application No. PCT/US16/20132, dated May 24, 2016, 9 pages.
International Search Report and Written Opinion for PCT Application No. PCT/US2017/061204 dated Dec. 21, 2017, 9 pages.
International Search Report and Written Opinion for PCT Application No. PCT/US2017/061206 dated Jan. 3, 2018, 11 pages.
"Intralinks VIA," 2015, Retrieved from <https://www/intralinks.com/sites/default/files/file_attach/intralinks_via_brochure.pdf,>13 pages.
IWashi, "How to Use Google Documents," Wind-mill Iwashi Blog, Dec. 17, 2014, retrieved from http://wind-mill.co.jp/iwashiblog/2014/12/google-document/,>Mar. 27, 2019, 12 pages.
Mislove A., et al., "POST: A secure, resilient, cooperative messaging system," Conference: Proceedings of HotOS'03: 9th Workshop on Hot Topics in Operating Systems, Lihue (Kauai), Hawaii, USA, May 18-21, 2003, 6 pages.
Nelson J C., "Wide-Area Software-Defined Storage," Jun. 2018, ProQuest Dissertations & Theses Global:The Sciences and Engineering Collection, 267 Pages.
Non-Final Office Action from U.S. Appl. No. 16/582,361, dated Jan. 8, 2020, 8 pages.
Non-Final Office Action from U.S. Appl. No. 16/582,425, dated Jan. 13, 2020, 8 pages.
Non-Final Office Action from U.S. Appl. No. 16/582,685, dated Jun. 23, 2020, 37 pages.
Notice of Allowance from U.S. Appl. No. 16/582,361, dated Mar. 30, 2020, 10 pages.
Notice of Allowance from U.S. Appl. No. 16/582,455, dated Dec. 12, 2019, 9 pages.
Notice of Allowance from U.S. Appl. No. 16/582,455, dated May 18, 2020, 5 pages.
Shimada H., "Online Storage Service having Documents-Editing Functions: Introduction to Google Drive for a Person that Missed the Wave," ITmedia Inc., Feb. 7, 2014, retrieved from internet URL: <https://web.archive.org/web/20140207083317/ >and <http://www.atmarkit.co.jp/ait/articles/1303/13/news1 05.html >on May 27, 2016, 21 pages.
Summons to attend oral proceedings pursuant to Rule 115(1) EPC for European Application No. 17805064.7 dated Apr. 21, 2020, 9 pages.
Voida S., et al., "Share and Share Alike: Exploring the User Interface Affordances of File Sharing," Proceedings of the ACM Conference on Human Factors in Computing Systems (CHI 2006), Apr. 22-27, 2006, ACM, 10 pages.
White C., "5 Unusual Ways to Use Dropbox You Might Not Have Thought of," Dec. 18, 2010, retrieved from <http://mashable.com/2010/12/18/dropbox-uses/ >on Sep. 15, 2017, 3 pages.
Wikihow, "How to Use Facebook(with cheat sheet)", 2013, retrieved from <http://www.wikihow.com/Use-Facebook >bn Mar. 28, 2019, 7 pages.
Notice of Allowance from U.S. Appl. No. 16/866,228, dated Sep. 9, 2020, 13 pages.
Notice of Allowance from U.S. Appl. No. 16/866,253, dated Sep. 8, 2020, 12 pages.

(56) References Cited

OTHER PUBLICATIONS

Examination Report No. 3, for Australian Application No. 2017385026, mailed on Aug. 04, 2020, 6 pp.

* cited by examiner

MANAGING CONTENT ACROSS DISCRETE SYSTEMS

CROSS-REFERENCE TO RELATED APPLICATIONS

This application claims priority to U.S. application Ser. No. 14/978,653, filed Dec. 22, 2015, which is hereby incorporated by reference in its entirety.

BACKGROUND

Migrating data and software from one system to another system can often be complicated. The volume of data, complexity of the file structure, and/or the complexity of the software configuration on the first system can make moving data and software to the second system very risky. Moreover, merging the two systems into a single system can be complicated and prone to problems as the two systems may not work well together once merged.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing content across discrete systems. A content management system can be implemented to manage content items and synchronize content items across devices. A content collaboration system can be implemented to generate documents and facilitate collaboration on documents. To take advantage of the content management system's functionality to manage and synchronize content items while also providing the collaboration functionality of the content collaboration system, the content management system can store and manage references to documents created in the content collaboration system. A reference can be a content item managed by the content management system that includes an identifier for the referenced document, but does not include the content of the referenced document.

When metadata for a document in the content collaboration system changes, the content management system can synchronize the updated metadata with client devices so that the metadata for the corresponding references matches the metadata for the document in the content collaboration system. Similarly, when a document is deleted from the content collaboration system, the content management system can delete references to the deleted document from client devices. Users can interact with references in the content management system just like other content items. For example, a user can select a reference to cause the user's device to present the corresponding document in the content management system. Thus, to users of the content management system, the reference appears to be the referenced document.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for a safe and convenient way to migrate and/or merge data and/or software configured on one system to another system.

Figure 1:
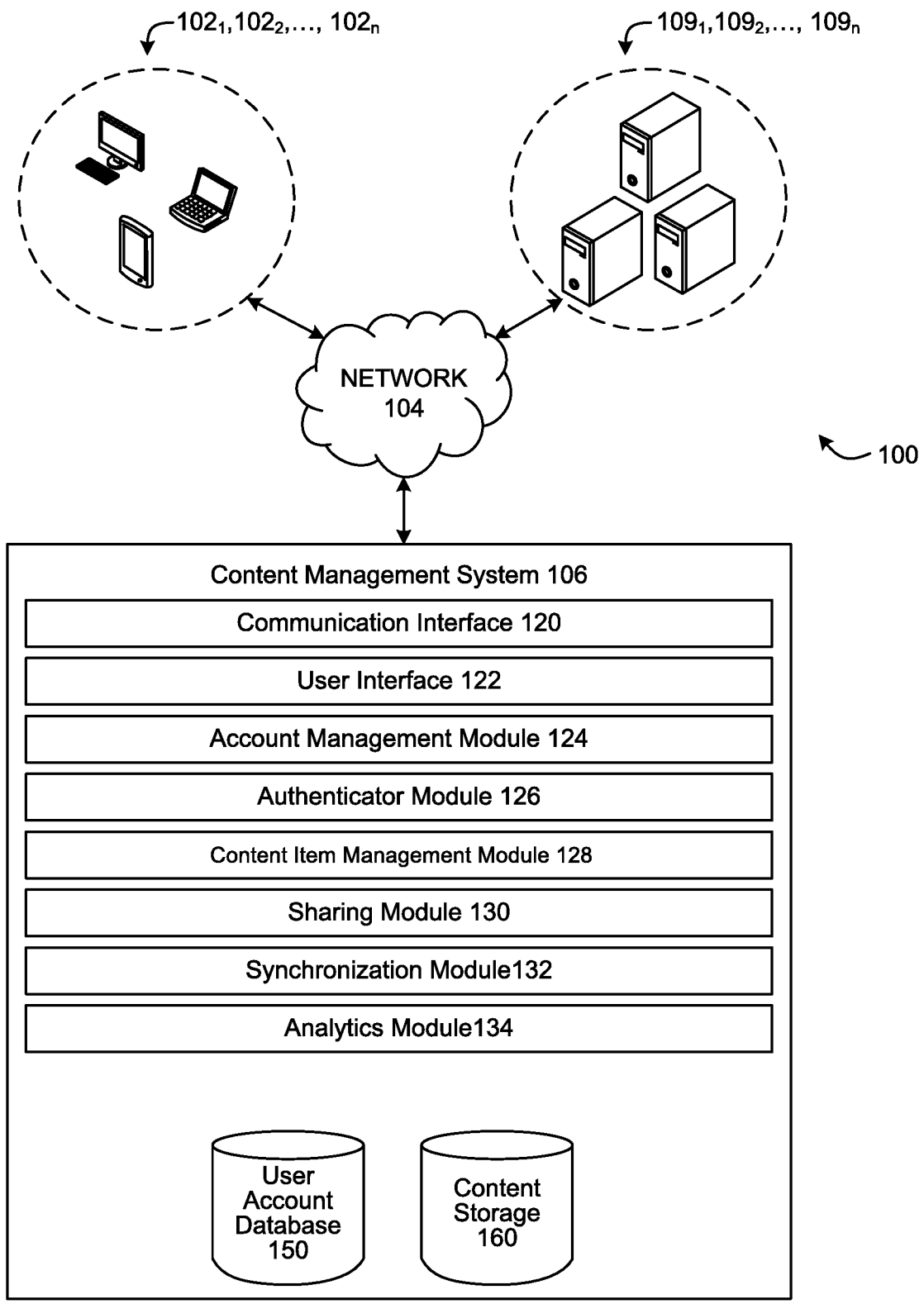
FIG. 1 shows an example configuration of devices and a network in accordance with some embodiments.

With respect to implementing various embodiments of the disclosed technology, an example system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 (e.g., an online synchronized content management system) through client devices $102_1$, $102_2$, ..., $102_n$ (collectively "102") connected to network 104 by direct and/or indirect communication. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content, as well as perform a variety of content management tasks, such as retrieve, modify, browse, and/or share the content. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type (e.g. free or paid), usage information, (e.g. file edit history), maximum storage space authorized, storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include collections for grouping content items together with different behaviors, such as folders, playlists, albums, etc. For example, an account can include a public folder that is accessible to any user. The public folder can be assigned a web-accessible address. A link to the web-accessible address can be used to access the contents of the public folder. In another example, an account can include: a photos collection that is intended for photos and that provides specific attributes and actions tailored for photos; an audio collection that provides the ability to play back audio files and perform other audio related actions; or other special purpose collection. An account can also include shared collections or group collections that are linked with and available to multiple user accounts. The permissions for multiple users may be different for a shared collection.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or some combination thereof. In one example of client software that integrates with an existing content management application, a user can manipulate content items directly in a local collection, while a background process monitors the local collection for changes and synchronizes those changes to content management system 106. Conversely, the background process can identify content that has been updated at content management system 106 and synchronize those changes to the local collection. The client software can provide notifications of synchronization operations, and can provide indications of content statuses directly within the content management application. Sometimes client device 102$_i$ may not have a network connection available. In this scenario, the client software can monitor the linked collection for content item changes and queue those changes for later synchronization to content management system 106 when a network connection is available. Similarly, a user can manually start, stop, pause, or resume synchronization with content management system 106.

A user can view or manipulate content via a web interface generated and served by user interface module 122. For example, the user can navigate in a web browser to a web address provided by content management system 106. Changes or updates to content in the content storage 160 made through the web interface, such as uploading a new version of a content item, can be propagated back to other client devices 102 associated with the user's account. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers 109$_1$, 109$_2$, . . . , 109$_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or fewer components are possible.

Figure 2:
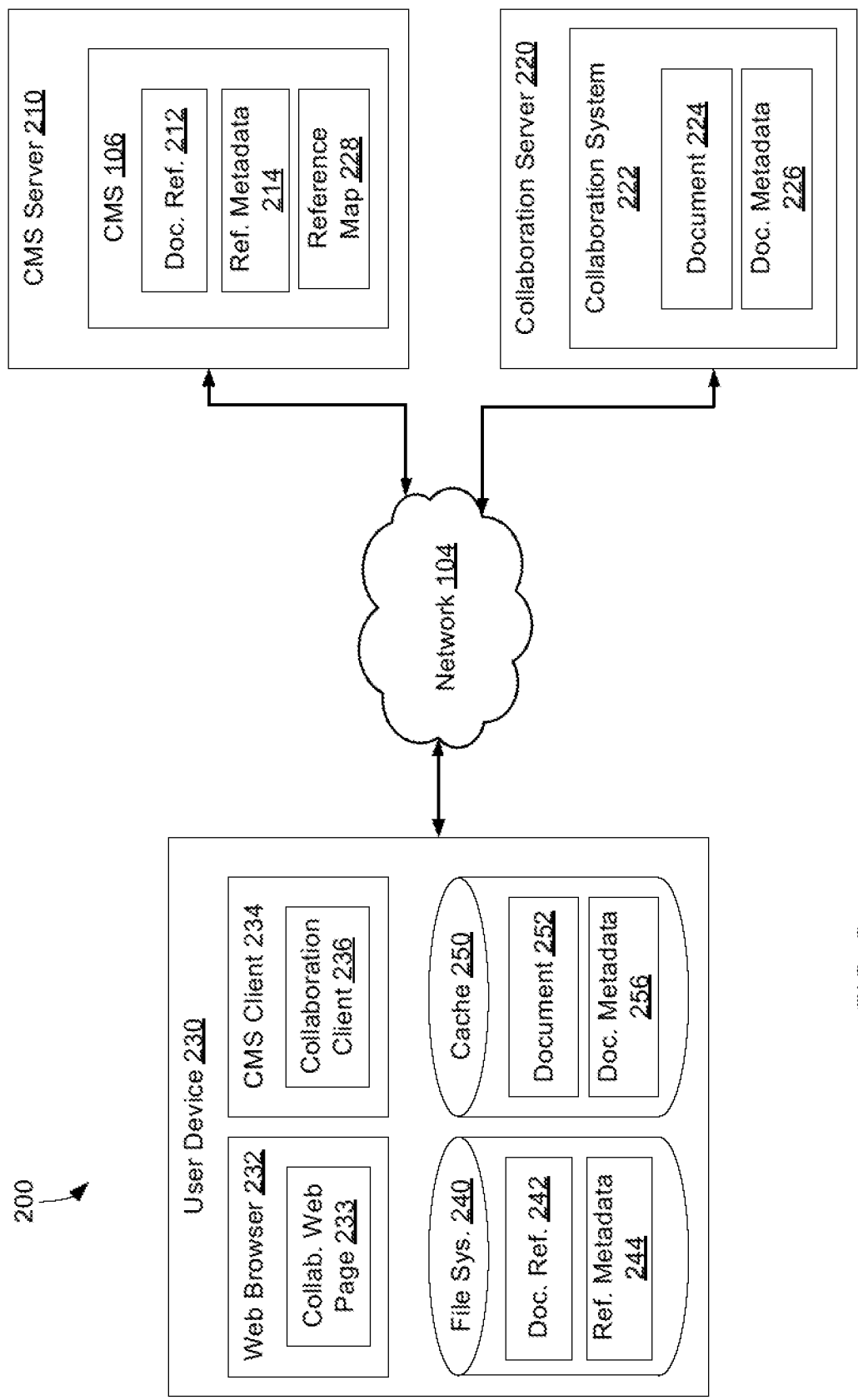
FIG. 2 illustrates an example system for managing content across discrete systems.

FIG. 2 illustrates an example system 200 for managing content across discrete systems. For example, system 200 can be configured to manage synchronization, distribution, and/or access to documents of collaboration system 222 on collaboration server 220 using references to the documents managed by content management system 106 of content management server 210. For example, content management server 210 can be a computing device or computing devices configured to run software of content management system 106, as described above with reference to FIG. 1.

The term "document" is used herein as a convenient way to distinguish a content item created, managed, and/or stored by collaboration system 222 from content items managed by content management system 106, as described above. A "document" can be any type of content item (e.g., file, image, word processing file, a presentation, a spreadsheet, a bundle of files, etc.). The term "reference" is used herein to refer to a content item managed by content management system 106 that includes a reference to a document of collaboration system 222. For example, the reference can be a file that includes a unique identifier (e.g., a number, sequence of characters and numbers, etc.) for the corresponding document in collaboration system 222. The file can have a unique file extension (e.g., file.ref, file.paper. file.note, etc.) that identifies the file as a reference to a document in collaboration system 222. Unless otherwise stated, the description below assumes that all users described herein have accounts with both content management system 106 and collaboration system 222 and are logged into the respective accounts.

In some embodiments, system 200 can include collaboration server 220. For example, collaboration server 220 can be a computing device or computing devices configured to run software of collaboration system 222. Collaboration system 222 can be software (e.g., a web server, collaboration server, document editor, etc.) configured on collaboration server 220 that allows users of collaboration system 222 to collaborate on creating, editing, and/or otherwise manipulating documents. For example, a user of user device 230 can invoke web browser 232 and navigate to collaboration server 220 using well-known mechanisms. For example, user device 230 can correspond to client device 102$_i$ of FIG. 1.

Creating Documents

In some embodiments, web browser 232 can receive web page 233 from collaboration system 222 that allows the user to create, modify, delete, rename, etc., documents (e.g., document 224) managed by collaboration system 222. For example, the user can provide input to web page 233 through web browser 232 to create a new document in collaboration system 222. In response to receiving the user input, web browser 232 can send a request to collaboration system 222 to create document 224. When the request is received, collaboration system 222 can create document 224 and/or document metadata 226 corresponding to document 224. For example, document metadata 226 can be stored in document 224. Document metadata 226 can be stored separately from document 224 (e.g., as a distinct file or object).

In some embodiments, web browser 232 can receive user input to save document 224. For example, web page 233 received from collaboration system 222 and presented by web browser 232 on user device 230 can present an option to save document 224 in content management system 106. Upon receiving user input selecting the save option, web browser 232 can present a graphical user interface (e.g., file system browser) that allows the user to specify a location (e.g., file system location, specific folder, etc.) in the user's account on content management system 106 where the document should be stored. After the user has provided input specifying the location where the document should be stored, web browser 232 can send the location to collaboration system 222.

In some embodiments, upon receiving the save location, collaboration system 222 can save the current state of document 224. For example, collaboration system 222 can save the contents of document 224 and/or document metadata 226. If document 224 has been modified, collaboration system 222 can, for example, save a timestamp indicating the time when document 224 was last modified in document metadata 226. If the user provided a new name for document 224 when specifying the save location, collaboration system 222 can rename document 224 according to the new name.

In some embodiments, upon receiving the save location, collaboration system 222 can send a request to content management system 106 to generate a reference for document 224. For example, if document 224 is a new document, then a new reference 212 can be created on content management system 106 for the new document. The new reference request can include the new name for document 224, the user-specified location (e.g., document save location) where the reference should be stored, a unique identifier for document 224, and/or metadata 226 for document 224, for example.

In some embodiments, upon receiving the new reference request, content management system 106 can generate a new reference to document 224. For example, content management system 106 can create document reference 212 having the same name as document 224. Content management system 106 can store or save reference 212 in the requesting user's account of content management system 106 at the user-specified location in the request. Content management system 106 can store the received document metadata 226 as reference metadata 214. For example, reference metadata 214 can be stored in document reference 214. Reference metadata 214 can be stored separately (e.g., as a distinct file or object) from document reference 212.

In some embodiments, content management system 106 can generate reference map 228. For example, reference map 228 can include data that maps or associates the identifier for document 224 to user accounts and locations where references to document 224 exist within content management system 106. For example, once document 224 and corresponding document reference 212 are created, the user of user device 230 can share document reference 212 just like any other content item in content management system 106. Each time a new reference to document 224 is created (e.g., copied, shared, added, etc.) in content management system 106 (e.g., by the user of user device 230 or by another user), content management system 106 can add a new mapping identifying the document referenced, the user account associated with the new reference, and the location of the new reference in the user account (e.g., "docID:user1:/home/folder1/doc.paper").

In some embodiments, reference map 228 can be a database that stores reference mappings for all documents in collaboration system 224. In some embodiments, reference map 228 can correspond to a single document (e.g., document 224). For example, content management system 106 can store a distinct reference map 228 for each document in collaboration system 222 that identifies user accounts and locations where references exist within content management system 106 that correspond to a specific document. For example, reference map 228 can identify user accounts and locations for references to document 224 only. For example, while reference 212 includes an identifier that allows content management system 106 to identify corresponding document 224 to collaboration system 222, reference map 228 includes information that allows content management system 106 to locate references to document 224 within content management system 106.

In some embodiments, content management system 106 can synchronize document reference 212 with user device 230. As described above with reference to FIG. 1, content management system 106 provides mechanisms to manage and synchronize content items with user devices. Since reference 212 and/or reference metadata 214 are content items managed by content management system 106, these content items can be synchronized with client device 230 in the same way as described above with reference to FIG. 1.

In some embodiments, content management system 106 can send reference 212 and metadata 214 to content management system (CMS) client 234 (e.g., client-side application of FIG. 1) on user device 230. CMS client 234 can store document reference 212 as document reference 242, for example, in file system 240 of user device 230. For example, file system 240 can be a local file system managed by content management system 106 and/or CMS client 234. Similarly, CMS client 234 can store reference metadata 244 corresponding to reference 242 in file system 240 of user device 230.

In some embodiments, CMS client 234 can store a local copy of document 224 in local cache 250. For example, cache 250 can be a hidden cache of documents corresponding to document references stored in file system 240. Cache 250 can be stored within file system 240. Cached document 252 can correspond to document reference 242, for example. For example, when a user selects document reference 240 and opens document 224, as described below, CMS client 234 can store a local copy of document 224 and document metadata 226 in cache 250 as document 252 and document metadata 256, respectively. In some embodiments, CMS client 234 can automatically request the current version of document 224 from collaboration system 222 when a new document reference 242 or updated metadata 244 is received by CMS client 234 from content management system 106. Thus, the user of user device 230 can still view documents of collaboration system 222 even when user device 230 is offline (e.g., not connected to network 104).

In some embodiments, cache 250 can be a read-only cache. For example, when the user of user device 230 opens document 252, the user may view the document but may not be able to edit the document. In some embodiments, cache 250 can be a read-write cache that allows the user to both view and edit document 252. In some embodiments, cache 250 can include document metadata 256 corresponding to document 252. Thus, when a user opens document 252, the corresponding metadata 256 can be read and a graphical user interface can be presented that presents the metadata for document 256.

Opening a Document Using CMS Native Client

In some embodiments, a user can open document 224 managed by collaboration system 222 through CMS client 234 by selecting document reference 242 stored on user device 242. For example, CMS client 234 can be a native client specifically built for the operating environment (e.g., operating system, device specifications, etc.) of user device 230. For example, a user can browse the local file system 240 on user device 230 using a well-known file browser or other operating system file browser. The user can locate document reference 242 within file system 240 and provide user input to user device 230 selecting document reference 242. Upon receipt of the user input selecting document reference 242, user device 230 (e.g., the operating system of user device 230) can invoke CMS client 234. For example, document reference 242 can have a file extension (e.g., .ref, .paper, .notes, etc.) associated with CMS client 234. The operating system of user device 230 can be configured to invoke CMS client 234 when a file with the appropriate extension is selected by a user, for example.

In some embodiments, CMS client 234 can open document 224 on collaboration system 222. For example, when the operating system of user device 230 invokes CMS client 234, the operating system can provide document reference 242 to CMS client 234. The operating system can, for example, provide the file system path for document reference 242 to CMS client 234 as a parameter to the invocation of CMS client 234. Upon receiving document reference 242, CMS client 234 can determine that document reference 242 is a reference to document 224 on collaboration system 222 and present document 224 on a display of user device 230.

In some embodiments, CMS client 234 can open document 224 on collaboration server 220. For example, when CMS client 234 determines that user device 230 is connected to network 104 (e.g., the Internet, a LAN, a WAN, etc.), then CMS client 234 can invoke collaboration client 236 to present document 224 on a display of user device 230. In some embodiments, collaboration client 236 can be a web client viewed through an internal web browser of CMS client 234. For example, CMS client 234 can obtain a document identifier from document reference 242. In some embodiments, CMS client 234 can invoke a web browser and pass a URL (e.g., "http://www.collaborator.com/editor/12345") that includes an address for collaboration system 222 (e.g., "http://www.collaborator.com") and the identifier (e.g., "12345") for document 224. The web browser can use the URL to obtain a web page for the web client (e.g., collaboration client 236) from collaboration system 222 that presents document 224. The user can then view or edit document 224 using various features of the web client.

In some embodiments, CMS client 234 can open document 252 on user device 230. For example, when CMS client 234 determines that user device 230 is not connected to network 104 (e.g., the Internet, a LAN, a WAN, etc.), then CMS client 234 can invoke collaboration client 236 to present document 252 on a display of user device 230. In some embodiments, collaboration client 236 can be an internal document viewer of CMS client 234. For example, collaboration client 236 can open document 252 and/or document metadata 256 locally and provide a read-only view of document 252 so that a user can view the contents of document 224 (e.g., represented by document 252) even when user device 230 is offline.

Opening a Document Using CMS Web Client

In some embodiments, a user can open document 224 managed by collaboration system 222 through a web client (e.g., web page) of content management system 106 presented by web browser 232. For example, the user can invoke web browser 232 and navigate through network 104 to content management system 106. Web browser 232 can receive a web page from content management system 106 that presents content items associated the user's account and managed by content management system 106. For example, the web page can include a representation of document reference 212 and reference metadata 214.

In some embodiments, upon receiving user input selecting document reference 212 on the web page, web browser 232 can send the selection to content management system 106. For example, upon receiving the selection of document reference 212, content management system 106 can determine that the selected content item is a collaboration document reference (e.g., based on the file extension, content item type, etc.) and redirect web browser 232 to collaboration system 222. For example, content management system 106 can send web browser 232 a URL that specifies an address for collaboration server 220 and identifies document 224, as described above. For example, the redirection can cause web browser 232 to receive collaboration system web page 233 for viewing and/or editing document 224. When web browser 232 receives web page 233, web browser 232 can present web page 233, including a representation of the contents of document 224 and/or metadata 226, on a display of computing device 230 for editing and/or viewing.

Syncing Changes Made at Collaboration System

Figure 3:
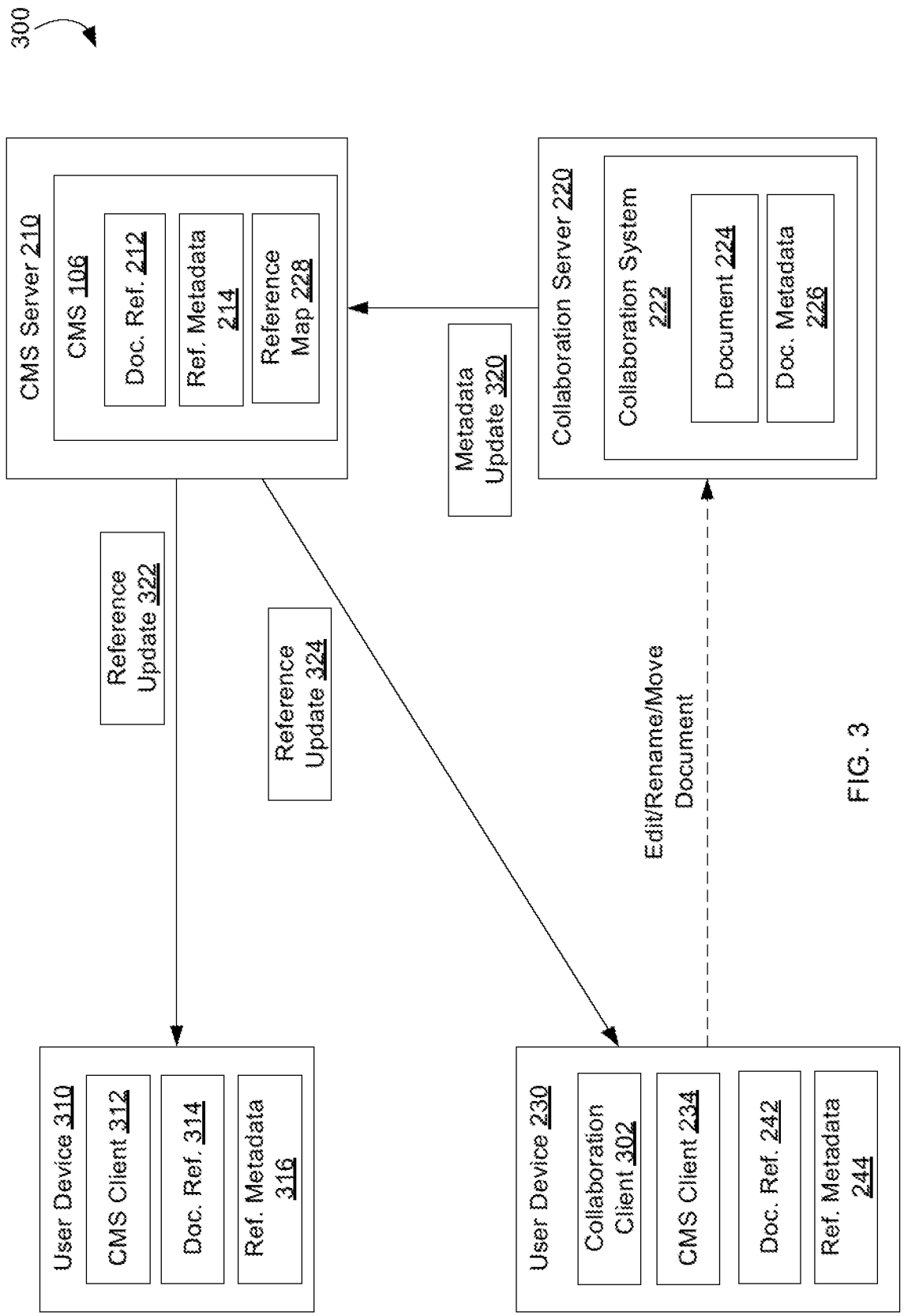
FIG. 3 is a block diagram of an example system for synchronizing document reference metadata in a content management system with document metadata in a collaboration system.

FIG. 3 is a block diagram of an example system 300 for synchronizing document reference metadata with document metadata. For example, system 300 can correspond to system 200 of FIG. 2. In some embodiments, a user of user device 230 can interact with collaboration client 302 to view and/or edit document 224 in collaboration system 222. For example, collaboration client 302 can be a web client presented by web browser 232, such as collaboration web page 233. Collaboration client 302 can correspond to collaboration client 236.

In some embodiments, the user can interact with collaboration system 222 through collaboration client 302 to change the name of document 224. For example, collaboration client 302 can present an option to rename document 224. The user can select the option to rename document 224 and provide a new name for document 224. Upon receiving the new name, collaboration client 302 can send the new name to collaboration system 222. When collaboration system 222 receives the new name, collaboration system 222 can rename document 224 according to the user-specified name. For example, collaboration system 222 can store the user-specified name in document metadata 226 corresponding to document 224 in collaboration system 222.

Similarly, the user can interact with collaboration system 222 through collaboration client 302 to change the location of document 224. For example, collaboration client 302 can present an option to move document 224. The user can select the option to move document 224 and provide a new location (e.g., folder, file system path, etc.) within the user's account on content management system 106 for document 224. Upon receiving the new location, collaboration client 302 can send the new location to collaboration system 222. When collaboration system 222 receives the new location, collaboration system 222 can store the new location for document 224 in document metadata 226 corresponding to document 224 in collaboration system 222.

In some embodiments, the user can cause document metadata 226 to change by editing document 224. For example, document metadata 226 can include a timestamp indicating when the most recent modification (e.g., edit) to document 224 occurred. When the user uses collaboration client 302 to edit document 224, collaboration system 222 will update this "last modified" timestamp in document metadata 226 to reflect the date and time of the latest modification to document 224.

In some embodiments, collaboration system 222 can send metadata updates to content management server 106. For example, collaboration system 222 can detect when a change to document metadata 226 occurs. When collaboration system 222 detects a change to document metadata 226, collaboration system 222 can send metadata update message 320 to content management server 106. For example, metadata update message 320 can include the unique collaboration system identifier for document 224 and any changes to document metadata 226. For example, if the name, location and/or last modified timestamp in document metadata 226 has changed, metadata update message 320 can include the new name, the new location and/or the new timestamp.

In some embodiments, content management system 106 can update document reference metadata to reflect document changes received in metadata update message 320. For example, content management system 106 can determine which document references need to be updated in response to receiving metadata update message 320 based on the document identifier in metadata update message 320. Content management system 106 can, for example, compare the document identifier in message 320 to reference map 228 to determine the user accounts and locations of references to document 224. For example, a copy of reference 212 may have been shared with multiple user accounts and the each user account may store a copy of reference 212 in a different location. Reference map 228 provides a mechanism by which content management server 106 can find the various copies of document reference 212 in content management system 106.

After content management system 106 determines the locations of references (e.g., reference 212) corresponding to document 224, content management system 106 can update the metadata (e.g., metadata 214) for each reference (e.g., reference 212) associated with document 224 to reflect the changes to document metadata 226. Reference metadata 214 can then be used to present a representation of document reference 212 having the new name, location, and/or last modified timestamp on a web client of content management system 106. Thus, the representation of document reference 212 on the graphical user interface of the web client will appear as if it is document 224 when viewed by a user.

In some embodiments, content management server 106 can synchronize reference metadata with client devices. For example, since reference metadata 214 is a content item managed by content management server 106, content management server 106 can synchronize reference metadata 214 managed by content management system 106 with reference metadata 244 on user device 230. For example, content management server 106 can send a reference update message 324 that identifies document reference 242 and contains information describing the changes to reference metadata 214.

If reference update 324 includes information indicating that the name of document 224 has changed, then CMS client 234 can change the name of document reference 242 on user device 230. If reference update 324 includes information indicating that the location of document 224 has changed, then CMS client 234 can move document reference 242 to a new location within file system 240 on user device 230. If reference update 324 includes information indicating that the last modified timestamp of document 224 has changed, then CMS client 234 can update the last modified timestamp of document reference 242 so that the correct timestamp is presented when document reference 242 is viewed in file system 240 on user device 230.

In some embodiments, system 300 can include user device 310. For example, user device 310 can be a device of another user (e.g., second user) with which document reference 212 has been shared. The user (e.g., first user) of user device 230 may have, for example, sent document reference 212 to the second user in an email message, instant message, or using some other electronic communication mechanism. The user of user device 310 can have a user account with content management system 106. The second user can save document reference 212 as document reference 314 on user device 310 in a file system of user device 310 managed by content management system 106.

Upon detecting the new content item in the managed file system, CMS client 312 can synchronize document reference 314 and/or reference metadata 316 with the user's account on content management system 106. When content management system 106 detects another copy of document reference 212 and/or reference metadata 214 in content management system 106, content management system 106 can update reference map 228 to map the user account and location of the new document reference to document 224, as described above. When changes to document reference 212 and/or reference metadata 214 received in metadata update message 320 from collaboration system 222, content management system 106 can synchronize the changes with user device 310 in the same way as changes are synchronized with user device 230, as described above. For example, content management system 106 can update the reference to document 224 in the second user's account on content management system 106 and send reference update message 322 to CMS client 312. For example, reference update message 322 can include an identifier (e.g., path and/or file name) for document reference 314 and describe the changes (e.g., new name, new location, new last modified timestamp, etc.) to the metadata for the reference to document 224 in the user's account.

Upon receiving reference update message 322, CMS client 312 on user device 310 can update document reference 314 and/or reference metadata 316 with the metadata changes described in reference update message 322. For example, CMS client 312 can rename document reference 314 to the new name specified by the user of user device 230 and described in reference update message 322. CMS client 312 can move document reference 314 to a new file system location (e.g., new folder, new director, etc.) specified by the user of user device 230 and described in reference update message 322. Thus, when the user (e.g., the second user) of user device 310 views or browses for document reference 314 in a file browser on user device 310, document reference 314 will be presented to the user with new name and/or at the new location specified by the user (e.g., the first user) of user device 230.

Syncing Changes Made at Client Device

Figure 4:
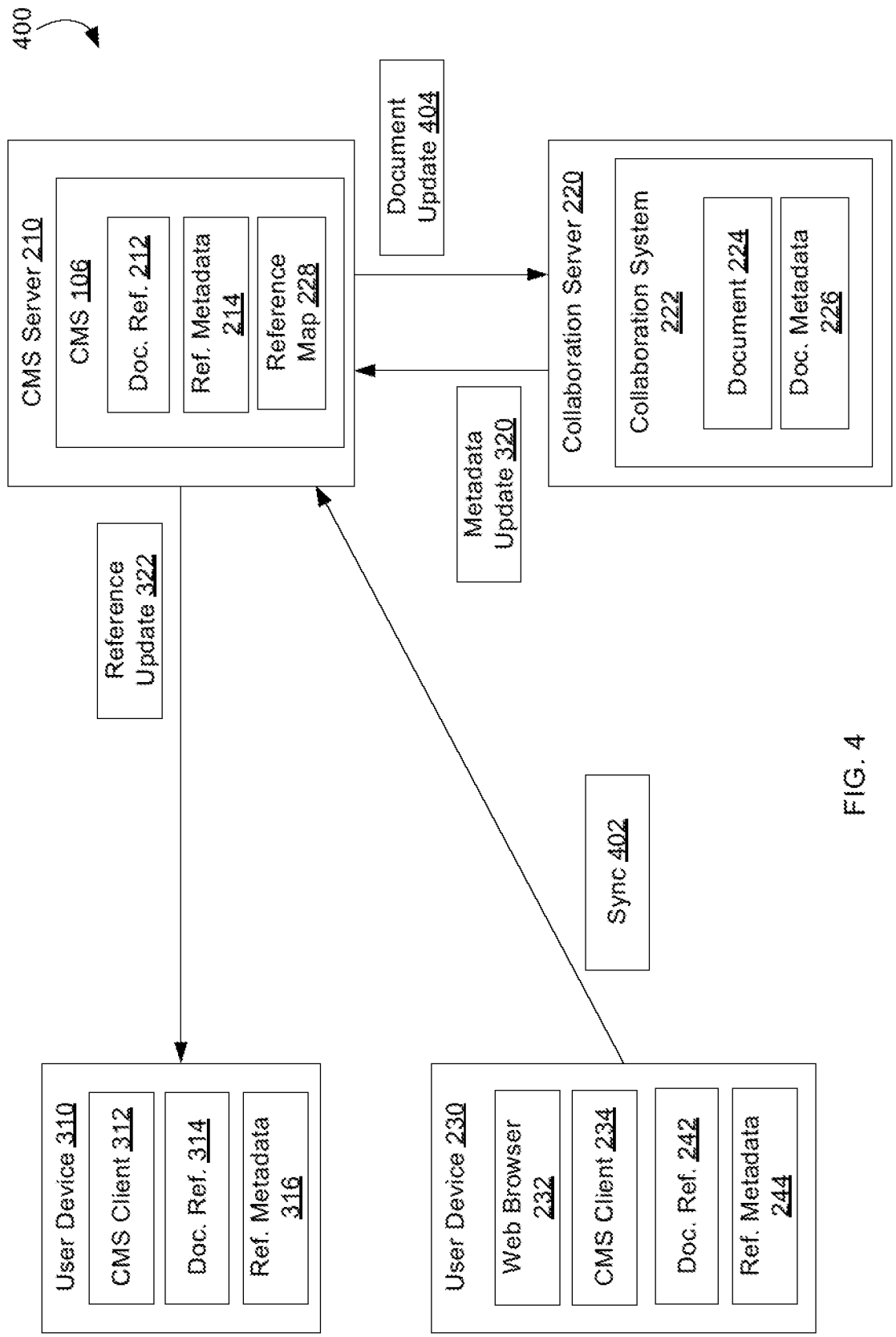
FIG. 4 is a block diagram of an example system for synchronizing document metadata in a collaboration system with document reference metadata in a content management system.

FIG. 4 is a block diagram of an example system 400 for synchronizing document metadata with document reference metadata. In some embodiments, a user can make changes to metadata 226 of document 224 in collaboration system 222 by modifying metadata 244 of document reference 242 on user device 230. For example, the user can browse file system 240 of FIG. 2 using a file browser on user device 230. The user can view a representation of document reference 242 and/or reference metadata 244 through the file browser. For example, the file browser can present a representative image for document reference 242. The file browser can present the name of document reference 242. The file browser can present some or all of metadata 242 for document reference 242, such as a last modified time, a list of users document 224 (or reference 212) has been shared with, and/or other metadata.

In some embodiments, the user may change reference metadata 244 through the file browser. For example, the user may provide input to cause the file browser on user device 230 to perform a rename operation on document reference 242 on user device 230 using the file browser. The user may provide input to cause the file browser on user device 230 to perform a move operation to move document reference 242 to another directory or folder in file system 240 on user device 230. After the move or rename operation is performed, the file browser can store the new name and/or new location in reference metadata 244.

In some embodiments, CMS client 234 on user device 230 can update reference metadata 214 on content management server 106 when reference metadata 244 has been modified on user device 230. For example, CMS client 234 can monitor file system 240 on user device 230 and detect changes to content items (e.g., including document reference 242 and/or reference metadata 244) in file system 240. When CMS client 234 detects changes to reference metadata 244, CMS client 234 can send synchronization message 402 to content management system 106. Synchronization message 402 can, for example, describe the changes the user made to reference metadata 244, such as changes to the name and/or location of document reference 242 within file system 240, as described above. Upon receiving synchronization message 402, content management system 106 can update reference metadata 214 with the metadata changes described in synchronization message 402.

Alternatively, the user of user device 230 can modify reference metadata 214 directly using web browser 232. For example, the user can used web browser 232 to navigate to a web page of content management system 106. The web page can present the content items in the user's account on content management system 106, such as document reference 212. The web page can present some or all of the data in reference metadata 214 when presenting document reference 212. For example, the metadata presented for document reference 212 can include a name for document reference 212 (e.g., document 224), a last modified timestamp for document 244, a location for document reference 212, and/or other metadata for document reference 212 and/or document 244.

In some embodiments, the user can provide input to web browser 232 to change metadata associated with document reference 212. For example, the user can provide input to the web page of content management system 106 to change the name and/or location of document reference 212. In response to receiving the user input, web browser 232 can send the new name and/or location for document reference 211 to content management system 106. Upon receipt of the new name and/or location, content management system can update reference metadata 214 with the new name and/or location for document reference 211.

In some embodiments, content management system 106 can send changed document metadata to collaboration system 222. For example, upon receiving changes or modifications to document reference 212 and/or reference metadata 214, content management system 106 can send document update message 404 describing changes made to document reference 212 and/or reference metadata 214 to collaboration system 222. Document update message 404 can include, for example, the identifier corresponding to document 244 and a description of the metadata changes to be applied to document metadata 226 (e.g., the new user-specified name and/or location for document 224). Upon receipt of document update 404, collaboration system 222 can identify and/or locate document 244 based on the document identifier and update the document metadata 226.

In some embodiments, collaboration system 222 can cause content management system 106 to update document references in response to receiving changes to document 224 and/or document metadata 226. As described above with reference to FIG. 3, collaboration system 222 can send metadata update 320 to content management system 106 describing changes made to document metadata 226. Metadata update message 320 can include the unique identifier for document 224 and a description of changes made to document metadata 226 (e.g., the new name, the new location, etc.).

In some embodiments, content management system 106 can update references to document 224 based on metadata update message 320. For example, content management system 106 can use the document identifier in metadata update message 320 to find the locations of all references to document 244 in reference map 228. The document identifier can be used as an index to find all of the user accounts and locations within user accounts where a copy of document reference 212 exists within content management system 106, for example.

After content management system 106 determines where each reference to document 224 is within content management system 106, content management system 106 can update the metadata for each reference with the metadata changes described in metadata update message 320. For example, content management system 106 can update each reference to document 224 (e.g., update the metadata for the reference) with the name and/or location changes specified by the user of user device 230.

After the metadata changes are applied to each reference to document 224 within content management system 106, content management system 322 can send the metadata changes for references to document 224 to other user devices, such as user device 310, in reference update message 322. For example, reference update message 322 can include an identifier for document reference 314 (e.g., current path and/or file name) and a description of the metadata changes to be applied to reference metadata 316. For example, reference update message 322 can include the new name and/or location for document 224 specified by the user of user device 230.

Upon receiving reference update message 322, CMS client 312 on user device 310 can update document reference 314 and/or reference metadata 316 with the metadata changes described in reference update message 322. For example, CMS client 312 can rename document reference 314 to the new name specified by the user of user device 230 and described in reference update message 322. CMS client 312 can move document reference 314 to a new file system location (e.g., new folder, new director, etc.) specified by the user of user device 230 and described in reference update message 322. Thus, when the user (e.g., the second user) of user device 310 views or browses for document reference 314 in a file browser on user device 310, document reference 314 will be presented to the user with new name and/or at the new location specified by the user (e.g., the first user) of user device 230.

Deleting Documents

Figure 5:
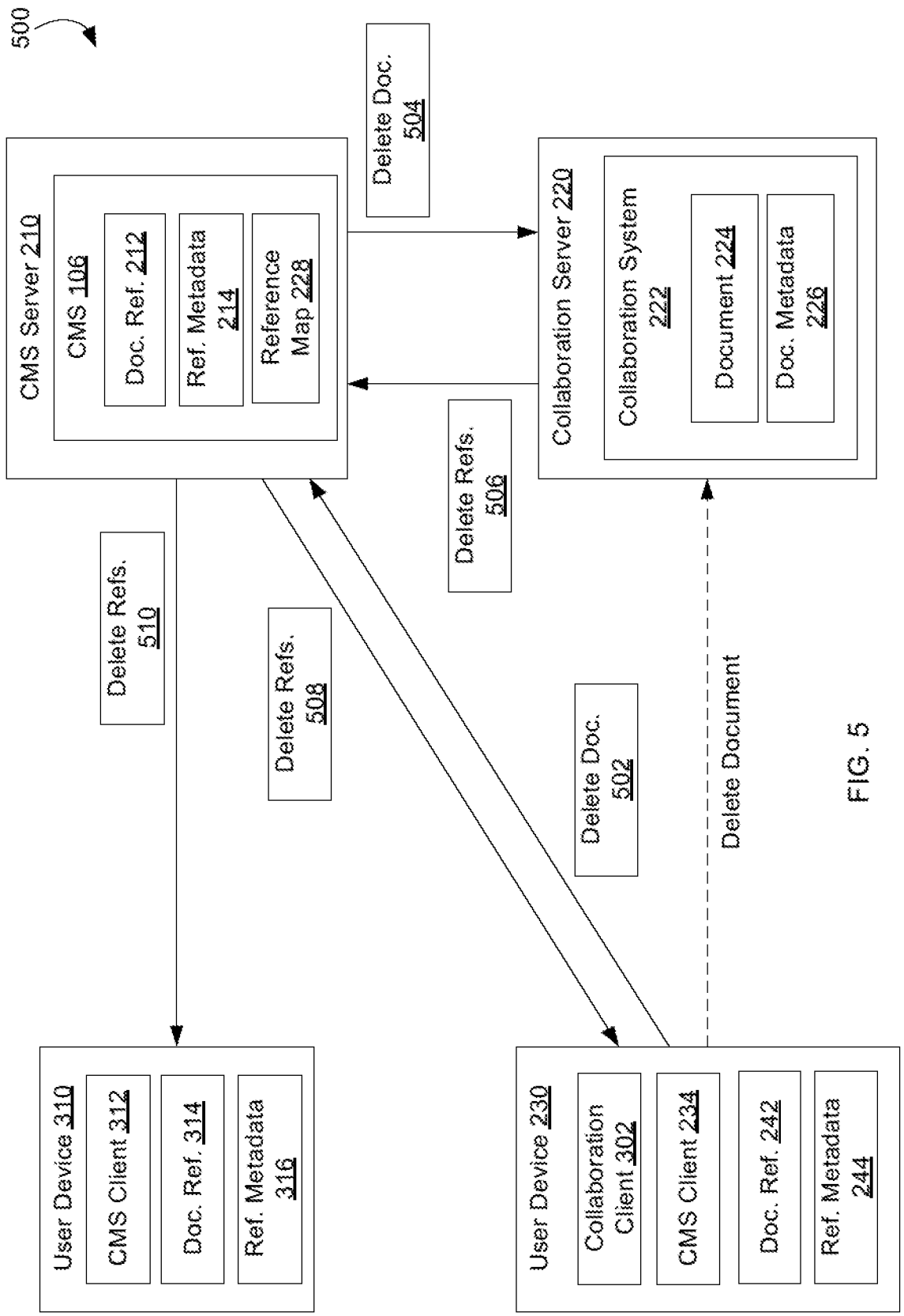
FIG. 5 is a block diagram of an example system for deleting references to a document in the collaboration system from the content management system when document is deleted from collaboration system.

FIG. 5 is a block diagram of an example system 500 for deleting references to document 224 in collaboration system 222 when document 224 is deleted from collaboration system 222. In some embodiments, content management system 106 can delete references to document 224 from content management system 106 and/or user devices (e.g., 230 and/or 310) when document 224 is deleted from collaboration system 222.

In some embodiments, user device 230 can delete document reference 242 upon receiving user input indicating the user's intent to delete document reference 242. For example, rather than causing document 224 to be deleted from collaboration system 222, user device 230 can delete document reference 242 and/or reference metadata 244 from user device 230. Since document reference 242 and reference metadata 244 are content items managed by CMS client 234, CMS client 234 will send a synchronization update to content management system 106 which will cause these content items to be deleted from the user's account on content management system 106. For example, CMS client 234 can send delete document message 502 that identifies the corresponding document reference 212 on content management system 106. Upon receiving message 502, content management system 106 can delete the corresponding document reference 212, delete corresponding metadata 214, and update reference map 228 to remove the entry for document reference 212. Thus, in some embodiments, deleting a document reference only causes removal of that specific document reference (and corresponding metadata) from the user's device and removal of the corresponding document reference (and corresponding metadata) from the user's account on content management system 106.

In some embodiments, deletion of a document reference on a user device can cause the deletion of the corresponding referenced document from collaboration system 222. For example, a user of user device 230 can provide input to the file browser on user device 230 to delete document reference 242. In response to receiving the input, user device 230 can delete document reference 242 and/or reference metadata 244. Since document reference 242 and reference metadata 244 are content items managed by CMS client 234, CMS client 234 will send a synchronization update to content management system 106 which will cause these content items to be deleted from the user's account on content management system 106. For example, CMS client 234 can send delete document message 502 that identifies the corresponding document reference 212 on content management system 106. Upon receiving message 502, content management system 106 can delete the corresponding document reference 212, delete corresponding metadata 214, and update reference map 228 to remove the entry for document reference 212.

Upon deleting document reference 214 from content management system 106, content management system 106 can send delete document message 504 to collaboration system 222 to cause collaboration system 222 to delete document 224 and corresponding document metadata 226. Message 504 can, for example, include the unique identifier for document 224. Upon receiving message 504, collaboration system 222 can remove document 224 and/or document metadata 226 from collaboration system 222.

Alternatively, the user of user device 230 can delete document 224 through collaboration client 302. For example, the user can view document 224 through collaboration client 302, as described above, and provide input to collaboration client 302 to delete document 224 from collaboration system 222. Collaboration client 302 can invoke an programming interface of collaboration system 222 for deleting documents from collaboration system 222 and provide the unique identifier for document 224 as a parameter to the invocation. Upon receiving the unique identifier, collaboration system 222 can remove document 224 and/or document metadata 226 from collaboration system 222.

In some embodiments, deletion of a document from collaboration system 222 causes all reference to the document to be deleted. For example, when collaboration system 222 removes document 224 from collaboration system 222, collaboration system 222 can send delete references message 506 (e.g., a delete command, API invocation, etc.) to content management system 106. Message 506 can include for, for example, the unique identifier corresponding to document 224. When content management system 106 receives delete references message 506, content management system 106 can determine the locations of all references to document 224 in content management system 106. For example, content management system 106 can look up the locations of references to document 224 in reference map 224 using the identifier for document 224 received in message 506. After the locations of each reference to document 224 are determined using reference map 228, content management system 106 can remove each of the references to document 224 from content management system 106. Since the references (e.g., document reference 212) are content items managed by content management system 106, content management system 106 can cause the document references (and corresponding metadata) on each user device to be deleted when performing normal synchronization operations.

In some embodiments, content management system 106 can send delete references messages 508 and 510 to user devices 230 and 310, respectively, to cause user devices 230 and 310 to delete document references corresponding to document 224. For example, message 508 can identify document reference 242 on user device 230. CMS client 234 can use the identifier (e.g., file name, path, serial number, etc.) of document reference 242 to find document reference 242 and/or metadata 244 on user device 230. Once found, user device 230 can delete document reference 242 and/or metadata 244. Similarly, message 510 can identify document reference 314 on user device 310. CMS client 312 can use the identifier (e.g., file name, path, serial number, etc.) of document reference 314 to find document reference 314 and/or metadata 316 on user device 230. Once found, user device 310 can delete document reference 314 and/or metadata 316.

Example Processes

Figure 6:
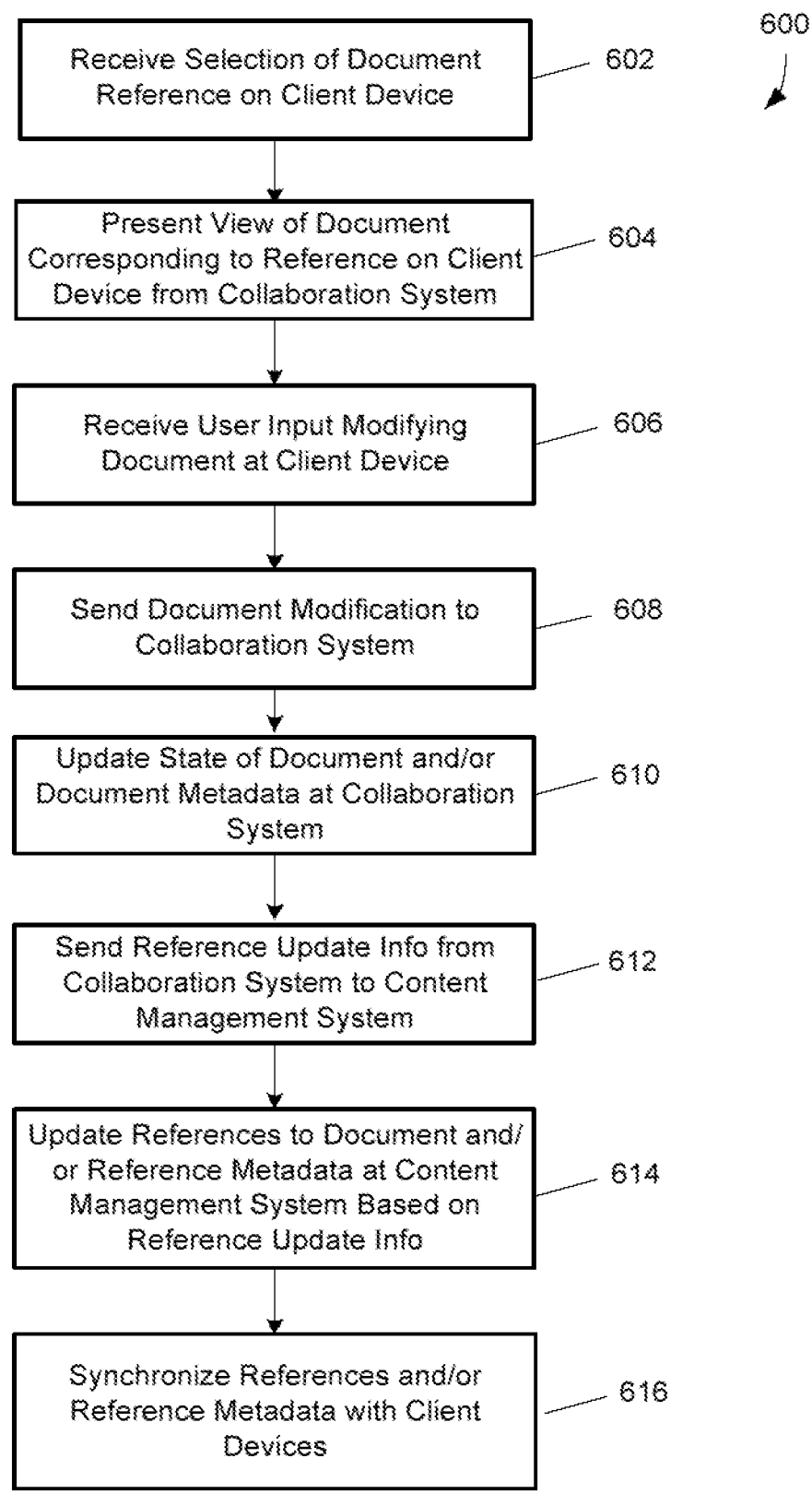
FIG. 6 is a flow diagram of an example process for synchronizing changes made to documents in collaboration system with references managed by content management system.

FIG. 6 is a flow diagram of an example process 600 for synchronizing changes made to documents in collaboration system 222 with references managed by content management system 106. As discussed above, when viewed by a user, document references managed by content management system 106 should appear to the user as if the document references are the documents referenced in collaboration system 222. Therefore, document references should be presented with the same metadata (e.g., name, location, last changed timestamp, etc.) as the document referenced. Thus, content management system 106 and collaboration system 222 should be configured to maintain synchronization of the metadata of the document and corresponding document references across both systems.

At step 602, a user device can receive a selection of a document reference stored on the user device. For example, a user of user device 230 can use a file browser on user device 230 to browse file system 240 and view a representation of document reference 242 and/or corresponding reference metadata 244. Document reference 242 can, for example, include a unique identifier for identifying a document within collaboration system 222. Document reference 242 can have a file extension or file type associated with CMS client 234. Reference metadata 244 can include, for example, a name, location, last modified timestamp, and/or other metadata that can be presented when presenting the representation of document reference 242, as described above.

At step 604, the user device can present a view of the document on the collaboration system corresponding to the document reference on the user device. For example, the user can select document reference 242 on user device 230 to invoke collaboration client 302 on user device 230, as described above. For example, user device 230 can be configured to open or invoke collaboration client 302 and/or CMS client 234 based on the file extension and/or file type of document reference 242. Collaboration client 302 can obtain the contents of document 224 from collaboration system 222 and present the contents of document 224 on a display of user device 230.

At step 606, the user device can receive user input modifying the document on the collaboration system. For example, the user can provide input to collaboration client 302 to edit the contents of document 224 on collaboration system 222. The user can provide input to collaboration client 302 to change the name of document 224. The user can provide input to collaboration client 302 to change the location where document 224 (e.g., reference 212) is stored in the file system of the user's account in content management system 106.

At step 608, the user device can send the document modification to the collaboration system. For example, collaboration client 302 can send information describing the edits and/or metadata changes (e.g., name change, location change, last modified timestamp change, etc.) to collaboration system 222.

At step 610, the collaboration system can update the state of the document and/or document metadata. For example, upon receiving the information describing the edits and/or metadata changes for document 224, collaboration system 222 can modify document 224 and/or document metadata 226 to reflect the edits and/or changes received from collaboration client 302.

At step 612, the collaboration system can send reference update information to the content management system. For example, after collaboration system 222 updates document 224 and/or document metadata 226 to reflect the edits and/or changes received from collaboration client 302, collaboration system 222 can send a document reference update message to content management system 106. The reference update message can include the unique identifier for document 224 and a description of changes made to document metadata 226.

At step 614, the content management system can update references to the document in the collaboration system based on the reference update information. For example, upon receipt of the reference update message, content management system 106 can identify document references in content management system 106 that refer to document 224. Content management system 106 can, for example, compare the unique identifier received in the reference update message to reference map 228 to identify and/or locate document references in content management system 106 that correspond to document 224. Content management system 106 can then update the reference metadata for each identified reference to reflect the changes made to document metadata 226.

At step 616, the content management system can synchronize references and/or reference metadata with user devices. For example, since the document references and/or reference metadata are content items managed by content management system 106, content management system 106 can synchronize the references and/or reference metadata with user devices similarly to other content items managed by content management system 106. Thus, user device 230 can present a representation of document reference 242 to a user that appears as if document reference 242 is the referenced document 224 on collaboration server 220.

Figure 7:
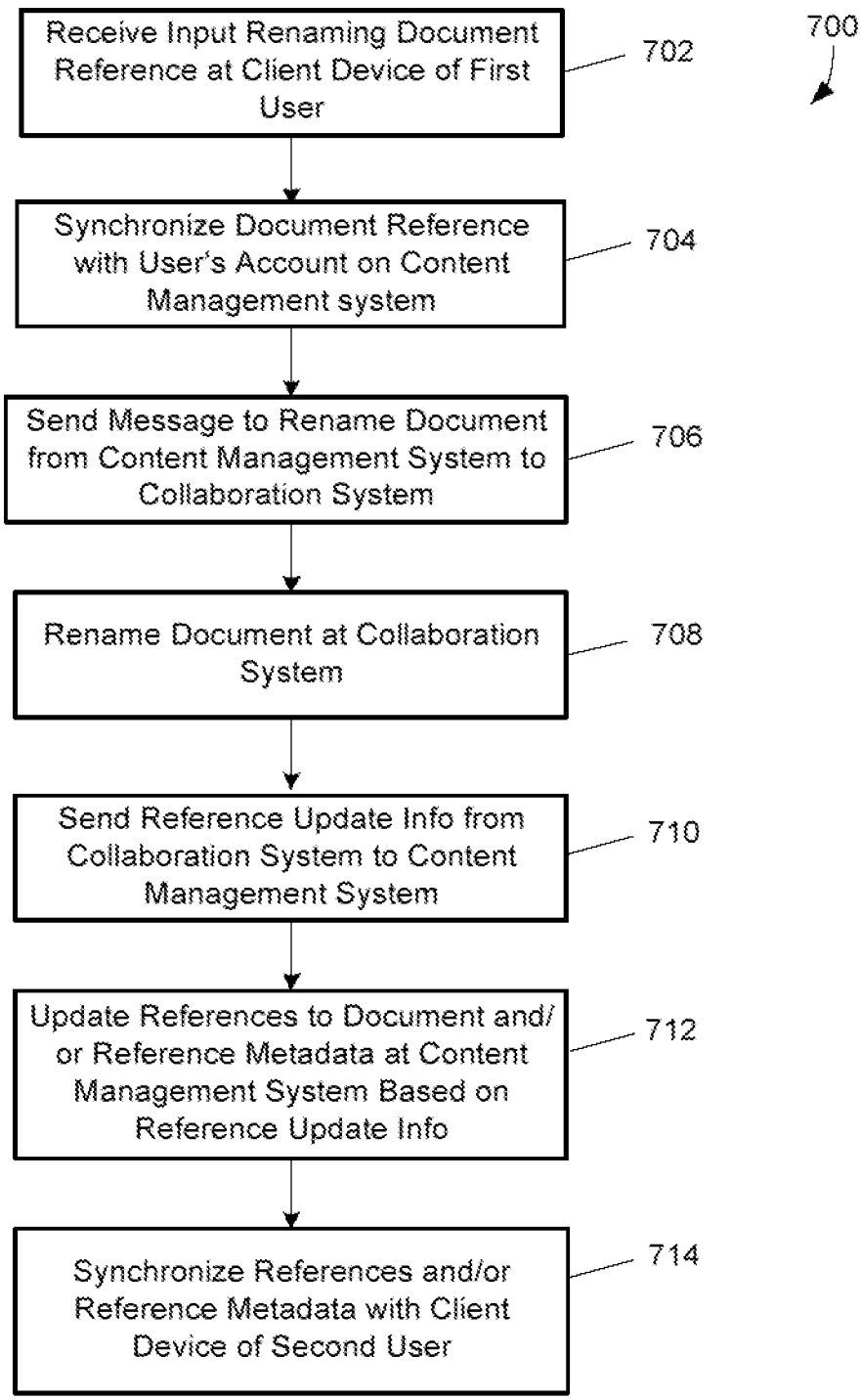
FIG. 7 is a flow diagram of an example process for synchronizing changes made to document references managed by content management system 106 with documents in collaboration system.

FIG. 7 is a flow diagram of an example process 700 for synchronizing changes made to document references managed by content management system 106 with documents in collaboration system 222. As discussed above, when viewed by a user, document references managed by content management system 106 should appear to the user as if the document references are the documents referenced in collaboration system 222. Therefore, document references should be presented with the same metadata (e.g., name, location, last changed timestamp, etc.) as the document referenced. Thus, content management system 106 and collaboration system 222 should be configured to maintain synchronization of the metadata of the document and corresponding document references across both systems.

At step 702, a user device can receive input renaming a document reference stored on the user device. For example, a user of user device 230 can use a file browser on user device 230 to browse file system 240 and view a representation of document reference 242 and/or corresponding reference metadata 244. Document reference 242 can, for example, include a unique identifier for identifying a document within collaboration system 222. Reference metadata 244 can include, for example, a name, location, last modified timestamp, and/or other metadata that can be presented when presenting the representation of document reference 242 on user device 230, as described above. The user can select an option in the file browser to rename document reference 242 and can provide input specifying a new name for document reference 242. The file browser can rename document reference 242 on user device 230 according to the new name specified by the user.

At step 704, the user device can synchronize the modified document reference with the user's account in the content management system. For example, since document reference 242 and/or reference metadata 244 are content items in file system 240 managed by CMS client 234 and content management system 106, CMS client 234 can automatically send information describing the change (e.g., the new name) to reference 242 and/or reference metadata 244 to content management system 106 upon detecting a change to document reference 242 and/or reference metadata 244.

In some implementations, upon receiving the information describing the change to reference 242 and/or reference metadata 244, content management system 106 can automatically update other references (e.g., reference and/or reference metadata) to document 224 managed by content management system 106. Alternatively, content management system 106 can wait for instructions from collaboration system 222 before updating references to document 224.

At step 706, the content management system can send a message to the collaboration system to rename the document corresponding to the renamed document reference. For example, content management system 106 can determine that the renamed content item (e.g., document reference 242) is a reference to a document in collaboration system 222 based on the type or extension of the content item. Based upon this determination, content management system 106 can send a message to collaboration system 222 to rename the document referenced by document reference 242. For example, content management system 106 can obtain an identifier for document 224 in collaboration system 222 from document reference 242. Content management system 106 can include the document identifier and the new name in the message sent to collaboration system 222.

At step 708, the collaboration system can rename the document corresponding to the renamed document reference. For example, upon receipt of the message from content management system 106, collaboration system 222 can rename the document (e.g., document 224) identified by the message according to the new name in the message. For example, collaboration system 222 can update document metadata 226 to reflect the new name for document 224.

At step 710, the collaboration system can send reference update information to the content management system. For example, after collaboration system 222 updates document 224 and/or document metadata 226 to reflect the new name specified by the user of user device 230, collaboration system 222 can send a document reference update message to content management system 106. The reference update message can include the unique identifier for document 224 and a description of changes (e.g., the new name) made to document metadata 226.

Alternatively, if content management system 106 is configured to update references at step 704, collaboration system 222 may not send reference update information to content management system 106 and process 700 can stop at step 708. For example, steps 712 and 714 can be performed at step 704.

At step 712, the content management system can update references to the document in the collaboration system based on the reference update information. For example, upon receipt of the reference update message, content management system 106 can identify document references in content management system 106 that refer to document 224. Content management system 106 can, for example, compare the unique identifier received in the reference update message to reference map 228 to identify and/or locate document references in various user accounts of content management system 106 that correspond to document 224. Content management system 106 can then update the reference metadata for each identified reference to reflect the changes made to document metadata 226.

At step 714, the content management system can synchronize references and/or reference metadata with user devices. For example, since the document references and/or reference metadata are content items managed by content management system 106, content management system 106 can synchronize the references and/or reference metadata with user devices similarly to other content items managed by content management system 106 so that all references to document 224 have the same name. Thus, user device 230 can present a representation of document reference 242 to a user that appears as if document reference 242 is the referenced document 224 on collaboration server 220.

Figure 8A:
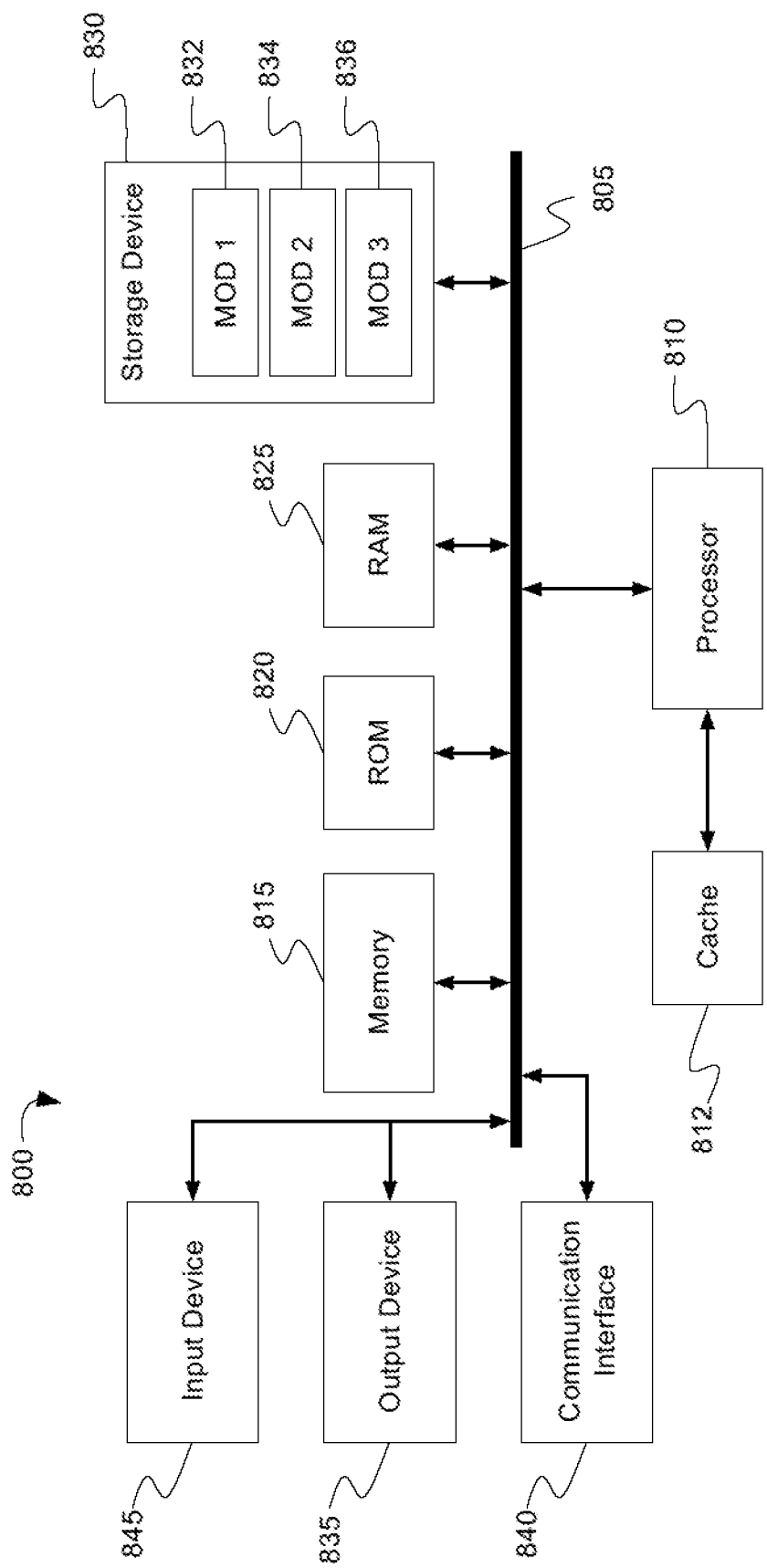
FIG. 8A shows an example possible system embodiment for implementing various embodiments of the present technology.
Figure 8B:
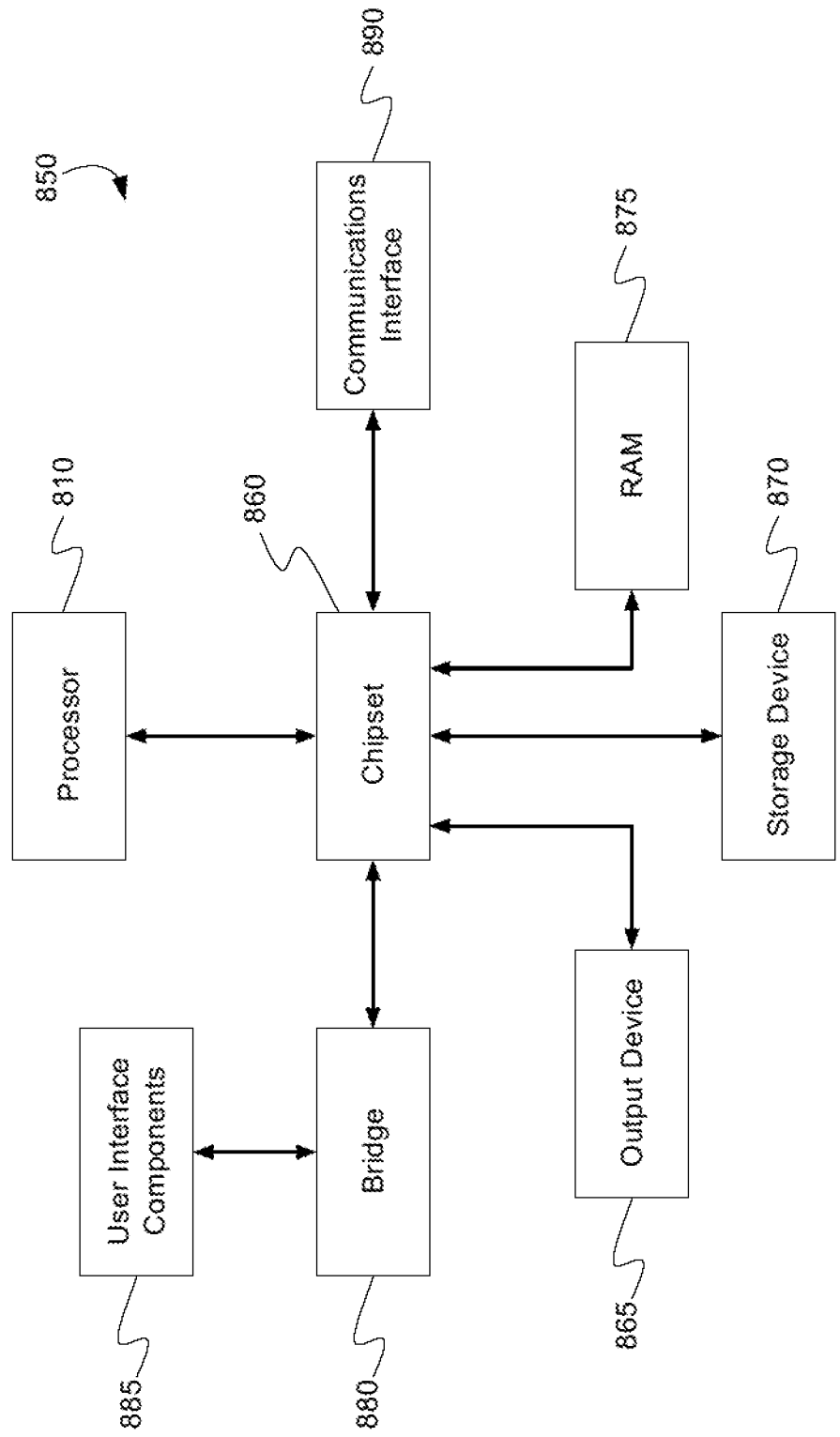
FIG. 8B shows an example possible system embodiment for implementing various embodiments of the present technology.

Example System Architectures 8A and FIG. 8B show example possible system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Example system 800 includes a processing unit (CPU or processor) 810 and a system bus 805 that couples various system components including the system memory 815, such as read only memory (ROM) 820 and random access memory (RAM) 825, to the processor 810. The system 800 can include a cache of high-speed memory connected directly with, in close proximity to, or integrated as part of the processor 810. The system 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates a computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 810, representative of any number of physically and/or logically distinct resources capable of executing software, firmware, and hardware configured to perform identified computations. Processor 810 can communicate with a chipset 860 that can control input to and output from processor 810. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 810 analyzing data stored in storage 870 or 875. Further, the machine can receive inputs from a user via user interface components 885 and execute appropriate functions, such as browsing functions by interpreting these inputs using processor 810.

It can be appreciated that example systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
receiving, by a content management system, a first message from a collaboration system, the first message including document metadata corresponding to a document generated and managed by the collaboration system;
storing, in the content management system, a document reference to the document in content storage, wherein the document reference is managed by the content management system;
in response to receiving the first message, saving, in the content management system, the document metadata received in the first message as reference metadata for the document reference;
synchronizing, by the content management system, the document reference and the reference metadata with a first local file system of a first client device;
detecting, by the content management system, that the first client device shared the document reference with a second client device;
based on the detecting, storing, by the content management system, a second document reference to the document and a second reference metadata in the content storage;
monitoring, by the content management system, the first local file system of the first client device for changes made locally to the document reference; and
upon detecting a change by the first client device to the document reference, synchronizing the change with the second document reference in a second local file system of the second client device and with the document managed by the collaboration system.

2. The method of claim 1, further comprising:
storing, by the content management system, a mapping of a first identifier for the document to a plurality of document references, the plurality of document references including the document reference;
in response to receiving the first message, comparing, by the content management system, a second identifier received in the first message to the first identifier in the mapping;
determining, by the content management system, that the first message includes metadata for the document reference based on the comparison; and
in response to determining that the first message includes metadata for the document reference, updating, by the content management system, the metadata for the document reference managed by the content management system.

3. The method of claim 2, wherein the plurality of document references includes a third reference, and further comprising:
determining, by the content management system, that the first message includes metadata for the third reference based on the comparison; and
in response to determining that the first message includes metadata for the third reference, updating, by the content management system, the metadata for the third reference managed by the content management system.

4. The method of claim 3, wherein the document reference corresponds to a first user account of the content management system and the third reference corresponds to a third user account of the content management system that is distinct from the first account.

5. The method of claim 1, further comprising:
receiving, by the content management system from a first user device, a second message including metadata corresponding to the document reference managed by the content management system;

updating, by the content management system, metadata corresponding to the document reference managed by the content management system based on the metadata in the second message; and sending, by the content management system, a third message including a document identifier for the document in the collaboration system corresponding to the document reference and the reference metadata, where the collaboration system updates metadata for the document in the collaboration system corresponding to the identifier based on the metadata received in the third message.

6. The method of claim 1, where the content management system and the collaboration system are distinct systems.

7. A non-transitory computer-readable medium including one or more sequences of instructions that, when executed by one or more processors of a content management system, causes:

receiving, by a content management system, a first message from a collaboration system, the first message including document metadata corresponding to a document generated and managed by the collaboration system;

storing, in the content management system, a document reference to the document in content storage, wherein the document reference is managed by the content management system;

in response to receiving the first message, saving, in the content management system, the document metadata received in the first message as reference metadata for the document reference;

synchronizing, by the content management system, the document reference and the reference metadata with a first local file system of a first client device;

detecting, by the content management system, that the first client device shared the document reference with a second client device;

based on the detecting, storing, by the content management system, a second document reference to the document and a second reference metadata in the content storage;

monitoring, by the content management system, the first local file system of the first client device for changes made locally to the document reference; and upon detecting a change by the first client device to the document reference, synchronizing the change with the second document reference in a second local file system of the second client device and with the document managed by the collaboration system.

8. The non-transitory computer-readable medium of claim 7, further comprising:

storing, by the content management system, a mapping of a first identifier for the document to a plurality of document references, the plurality of document references including the document reference;

in response to receiving the first message, comparing, by the content management system, a second identifier received in the message to the first identifier in the mapping;

determining, by the content management system, that the first message includes metadata for the document reference based on the comparison; and in response to determining that the first message includes metadata for the document reference, updating, by the content management system, the metadata for the document reference managed by the content management system.

9. The non-transitory computer-readable medium of claim 8, wherein the plurality of document references includes a third reference, and further comprising:

determining, by the content management system, that the first message includes metadata for the third reference based on the comparison; and in response to determining that the first message includes metadata for the third reference, updating, by the content management system, the metadata for the third reference managed by the content management system.

10. The non-transitory computer-readable medium of claim 9, wherein the document reference corresponds to a first user account of the content management system and the third reference corresponds to a third user account of the content management system that is distinct from the first account.

11. The non-transitory computer-readable medium of claim 7, further comprising:

receiving, by the content management system from a first user device, a second message including metadata corresponding to the document reference managed by the content management system;

updating, by the content management system, metadata corresponding to the document reference managed by the content management system based on the metadata in the second message; and sending, by the content management system, a third message including a document identifier for the document in the collaboration system corresponding to the document reference and the reference metadata, where the collaboration system updates metadata for the document in the collaboration system corresponding to the identifier based on the metadata received in the third message.

12. The non-transitory computer-readable medium of claim 7, where the content management system and the collaboration system are distinct systems.

13. A content management system comprising:

one or more processors; and a memory having programming instructions stored thereon, which, when executed by the one or more processors, performs one or more operations, comprising:

receiving a first message from a collaboration system, the first message including document metadata corresponding to a document generated and managed by the collaboration system;

storing a document reference to the document in content storage, wherein the document reference is managed by the content management system;

in response to receiving the first message, saving the document metadata received in the first message as reference metadata for the document reference;

synchronizing the document reference and the reference metadata with a first local file system of a first client device;

detecting that the first client device shared the document reference with a second client device;

based on the detecting, storing a second document reference to the document and a second reference metadata in the content storage;

monitoring the first local file system of the first client device for changes made locally to the document reference; and upon detecting a change by the first client device to the document reference, synchronizing the change with the second document reference in a second local file system of the second client device and with the document managed by the collaboration system.

14. The content management system of claim 13, wherein the one or more operations further comprise:
storing a mapping of a first identifier for the document to a plurality of document references, the plurality of document references including the document reference;
in response to receiving the first message, comparing a second identifier received in the message to the first identifier in the mapping;
determining that the first message includes metadata for the document reference based on the comparison; and
in response to determining that the first message includes metadata for the document reference, updating the metadata for the document reference managed by the content management system.

15. The content management system of claim 14, wherein the plurality of document references includes a third reference, and the one or more operations further comprise:
determining that the message includes metadata for the third reference based on the comparison; and
in response to determining that the first message includes metadata for the third reference, updating the metadata for the third reference managed by the content management system.

16. The content management system of claim 15, wherein the document reference corresponds to a first user account of the content management system and the third reference corresponds to a third user account of the content management system that is distinct from the first account.

17. The content management system of claim 14, wherein the one or more operations further comprise:
receiving, from a first user device, a second message including metadata corresponding to the document reference managed by the content management system;
updating metadata corresponding to the document reference managed by the content management system based on the metadata in the message; and
sending a third message including a document identifier for the document in the collaboration system corresponding to the document reference and the reference metadata, where the collaboration system updates metadata for the document in the collaboration system corresponding to the identifier based on the metadata received in the third message.

18. The content management system of claim 14, where the content management system and the collaboration system are distinct systems.

* * * * *